US012478526B2

(12) United States Patent
Lehto et al.

(10) Patent No.: US 12,478,526 B2

(45) Date of Patent: Nov. 25, 2025

(54) ADJUSTABLE PEDESTAL STRUCTURE OF THE BED

(71) Applicants: Juha Lehto, Kirkkonummi (FI); Pyry Lehto, Espoo (FI); Pirkka Frosti, Espoo (FI)

(72) Inventors: Juha Lehto, Kirkkonummi (FI); Pyry Lehto, Espoo (FI); Pirkka Frosti, Espoo (FI)

( * ) Notice: Subject to any disclaimer, the term of this patent is extended or adjusted under 35 U.S.C. 154(b) by 767 days.

(21) Appl. No.: 17/620,326

(22) PCT Filed: Jun. 25, 2020

(86) PCT No.: PCT/FI2020/050458

§ 371 (c)(1),
(2) Date: Dec. 17, 2021

(87) PCT Pub. No.: WO2020/260764

PCT Pub. Date: Dec. 30, 2020

(65) Prior Publication Data

US 2022/0265495 A1 Aug. 25, 2022

(30) Foreign Application Priority Data

Jun. 27, 2019 (FI) ..................................... 20195567

(51) Int. Cl.
*A61G 7/005* (2006.01)
*A47C 19/04* (2006.01)
(Continued)

(52) U.S. Cl.
CPC ............ *A61G 7/005* (2013.01); *A47C 19/045* (2013.01); *A61G 7/012* (2013.01); *A61G 7/018* (2013.01)

(58) Field of Classification Search
CPC ........ A47C 19/045; A61G 7/012; A61G 7/58; A61G 7/015; A61G 7/005; A61G 13/06;
(Continued)

(56) References Cited

U.S. PATENT DOCUMENTS 5,149,074 A * 9/1992 Jarin ........................ A61B 6/04 5/601
5,566,412 A 10/1996 Arnold
(Continued)

FOREIGN PATENT DOCUMENTS

CN 109363850 A 2/2019
DE 2201921 B1 * 1/1973
(Continued)

OTHER PUBLICATIONS

PCT International Search Report for PCT Application No. PCT/FI2020/050458 mailed Sep. 10, 2020 (4 pages).
(Continued)

*Primary Examiner* — Justin C Mikowski
*Assistant Examiner* — Amanda L Bailey
(74) *Attorney, Agent, or Firm* — Merchant & Gould P.C.

(57) ABSTRACT

The object of the invention is the adjustable pedestal structure of the bed, by means of which the height and tilt positions of the sleeping platform structure can be adjusted. The pedestal structure consists of the three structural parts supported by the foot structure (30) equipped with wheels, the lower structural part (1*a*), the middle structural part (1*b*) and the upper structural part (1*c*), which consist of the rotation cylinders (2, 4, 6) acting as the adjustment mechanisms for the simultaneous or individual adjustment movements of the structural parts of the pedestal structure and the lever arms (3, 7, 5*a*) connected thereto and the axles (13*a*, 13*b*, 13*c*) connected to the ends of the lever arms to opposite ends of the rotation cylinders, around which the adjusting
(Continued)

Figures 1A, 1B:
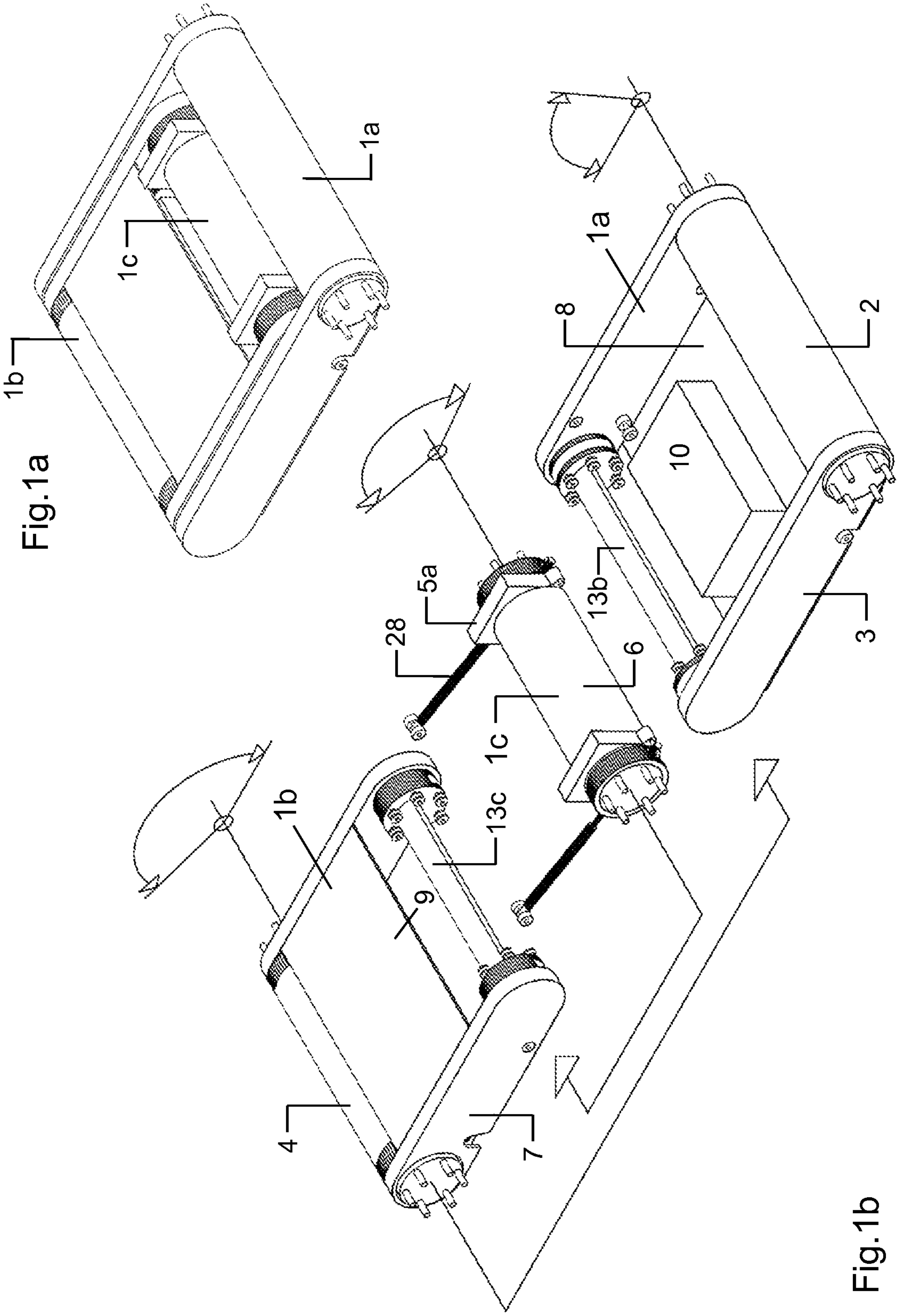

movements of the structural parts of the adjustable pedestal structure take place. The sleeping platform frame structure of the bed (31) is connected to the lever arms (5*a*) of the upper structural part (1*c*) of the pedestal structure.

7 Claims, 20 Drawing Sheets

(51) Int. Cl.
*A61G 7/012* (2006.01)
*A61G 7/018* (2006.01)

(58) Field of Classification Search
CPC .......... A61G 13/00; A61G 13/02; A61G 5/14; A61G 7/018; A61B 6/04; A61B 6/0428; A61B 6/0407; A61B 6/0414; A61B 6/0421; A61B 5/704
See application file for complete search history.

(56) References Cited

U.S. PATENT DOCUMENTS

| | | | | |
|---|---|---|---|---|
| 6,502,261 | B1 * | 1/2003 | Harwood | A61B 6/0487 5/601 |
| 6,507,964 | B1 | 1/2003 | Lewandowski et al. | |
| 7,640,607 | B2 * | 1/2010 | Guertin | A61B 6/4441 5/601 |
| 8,584,281 | B2 * | 11/2013 | Diel | A61G 13/02 5/601 |
| 2009/0235456 | A1 * | 9/2009 | Bock | A47C 20/08 5/616 |
| 2017/0281438 | A1 | 10/2017 | Elku et al. | |
| 2018/0055707 | A1 * | 3/2018 | Stanton | A61B 6/0442 |

FOREIGN PATENT DOCUMENTS

| | | | | |
|---|---|---|---|---|
| EP | 0373245 | A1 * | 6/1990 | |
| EP | 0389332 | A1 * | 9/1990 | |
| EP | 511049 | A1 * | 10/1992 | A61B 6/0487 |
| FR | 2649008 | A2 * | 1/1991 | |
| IT | BO20110150 | | 9/2012 | |
| NL | 1005797 | C2 * | 10/1998 | A61B 6/04 |
| WO | WO-9846137 | A1 * | 10/1998 | A61B 6/04 |
| WO | WO-2016039233 | A1 * | 3/2016 | A61G 3/04 |
| WO | 2018/172599 | A1 | 9/2018 | |

OTHER PUBLICATIONS

PCT Written Opinion for PCT Application No. PCT/FI2020/050458 mailed Sep. 10, 2020 (5 pages).
Finnish Search Report for FI Application No. 20195567 mailed Jan. 27, 2020 (1 page).

* cited by examiner

ADJUSTABLE PEDESTAL STRUCTURE OF THE BED

This application is a National Stage Application of PCT/FI2020/050458, filed 25 Jun. 2020, which claims benefit of Ser. No. 20/195,567, filed 27 Jun. 2019 in Finland, and which applications are incorporated herein by reference. To the extent appropriate, a claim of priority is made to each of the above disclosed applications.

1. THE USE OF THE PRODUCT ACCORDING TO THE INVENTION

The adjustable pedestal structure supporting the sleeping platform structure of the bed of the invention enables all known adjustment movements of the height and tilt positions of the sleeping platform structure of the adjustable beds. The adjustable pedestal structure of the bed of the invention makes it possible to implement adjustable bed solutions for institutional and home care with complete and universal adjustment characteristics, to facilitate the work of nursing staff and caregivers, and to promote the rehabilitation and mental well-being of patients and people with disabilities. The adjustable pedestal structure of the bed of the invention can be connected into the sleeping platform structure of almost any traditional structurally solid or adjustable bed to replace the traditional support and adjustment mechanisms of the sleeping platform structures used in them.

2. PRIOR ART SOLUTIONS

Figure 15A:
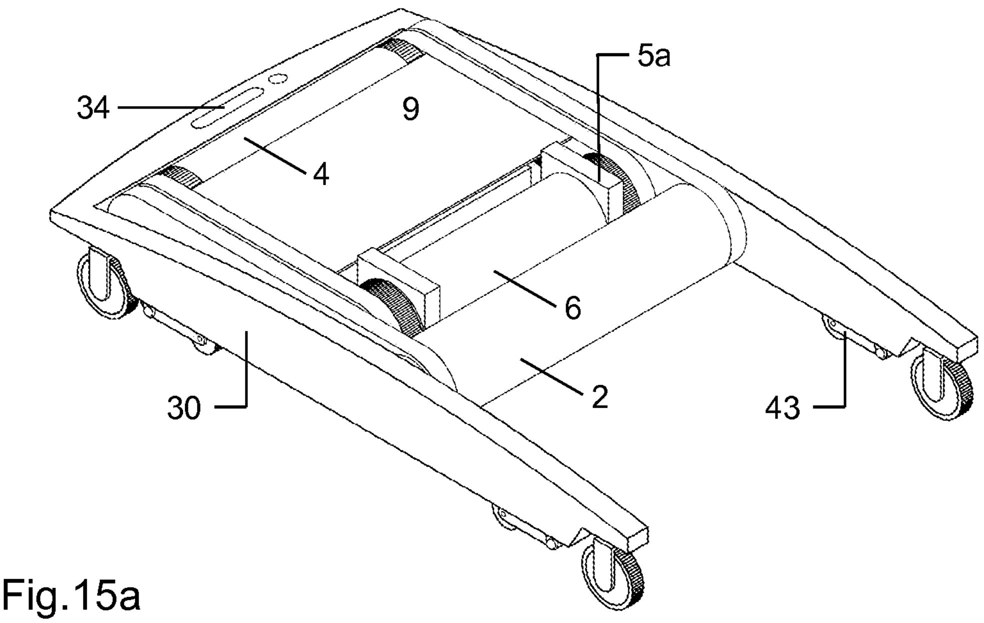
Figure 15B:
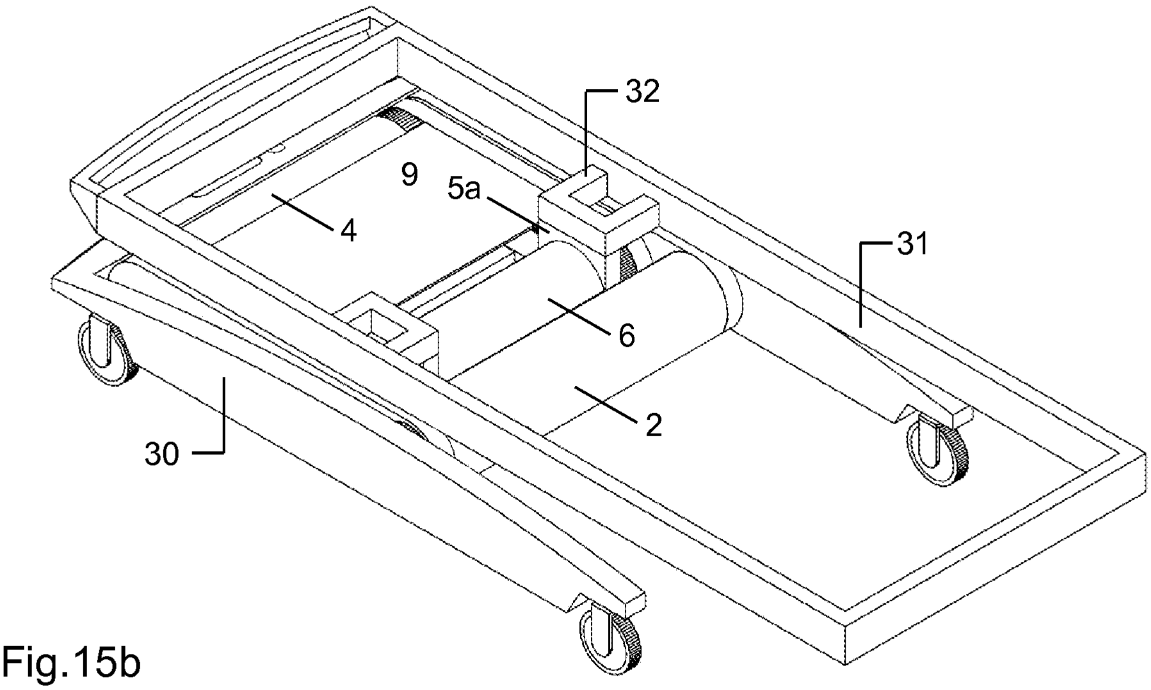
Figure 16:
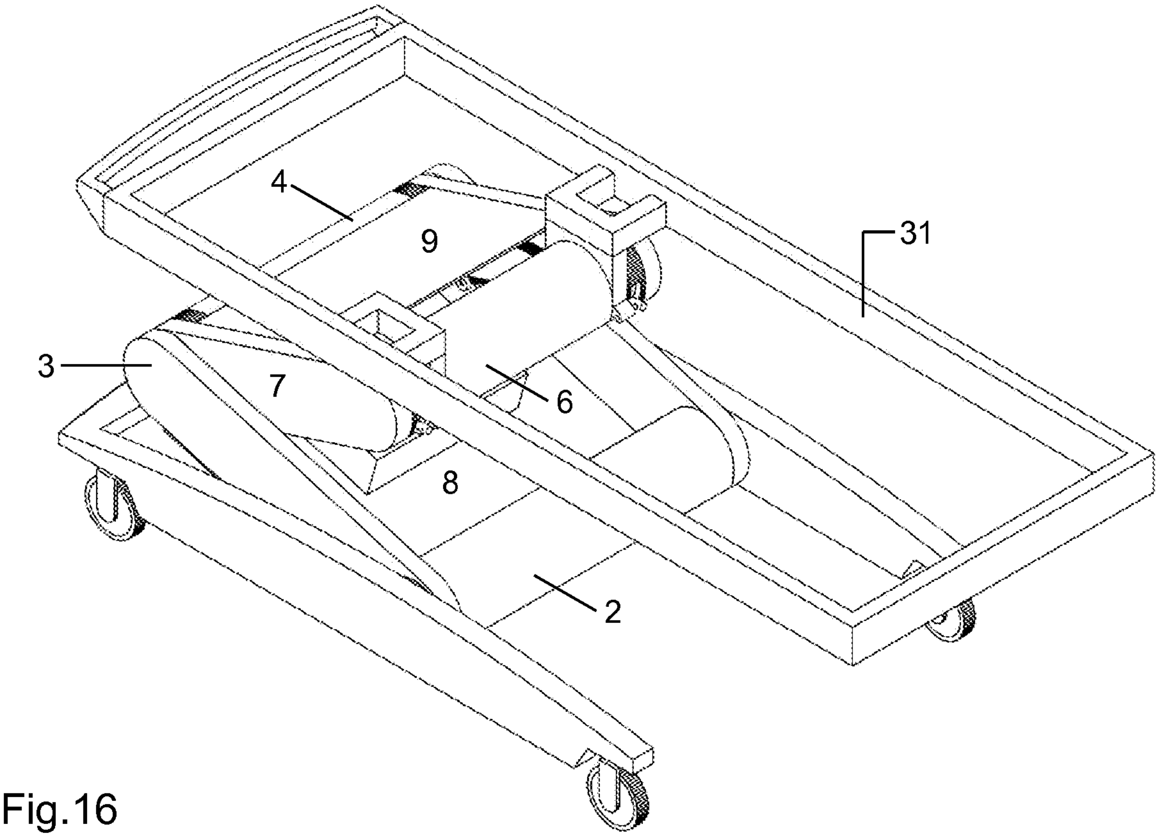
Figure 17:
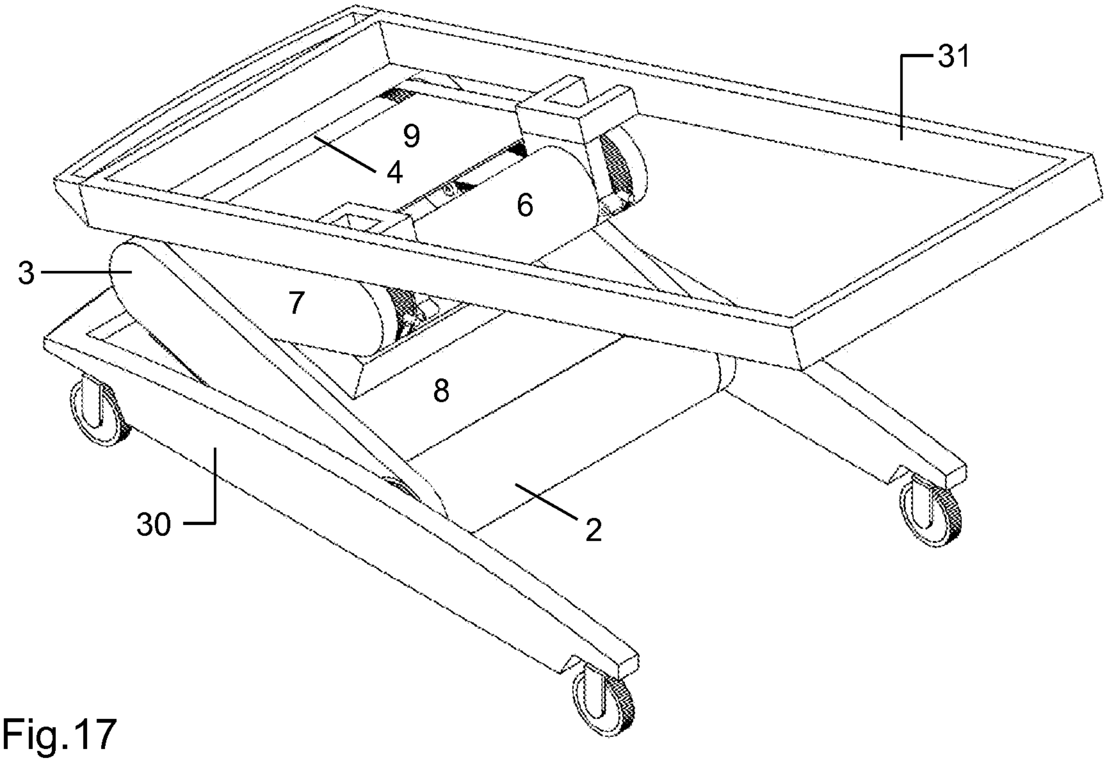
Figure 22:
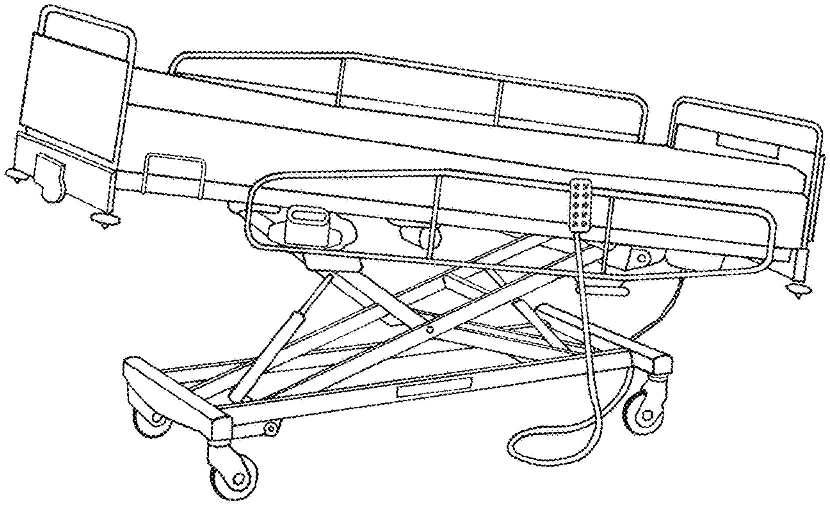
Figure 23:
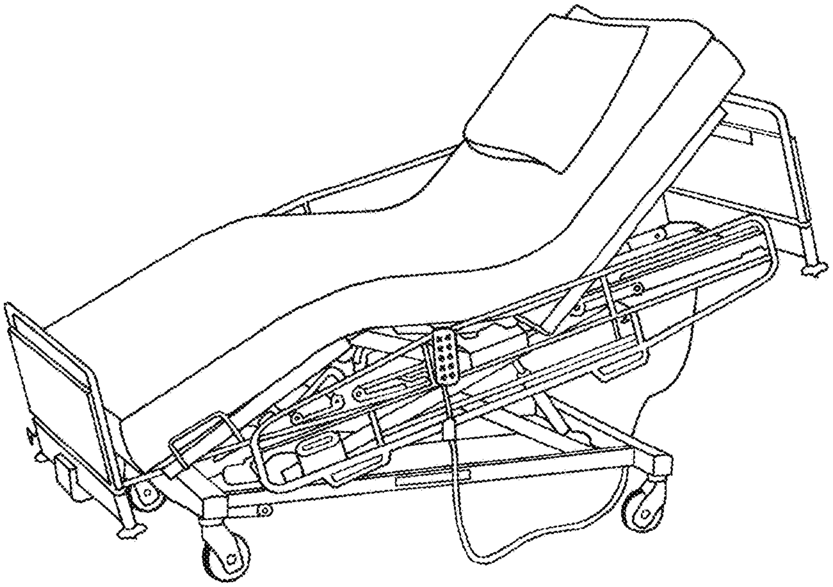
Figure 24:
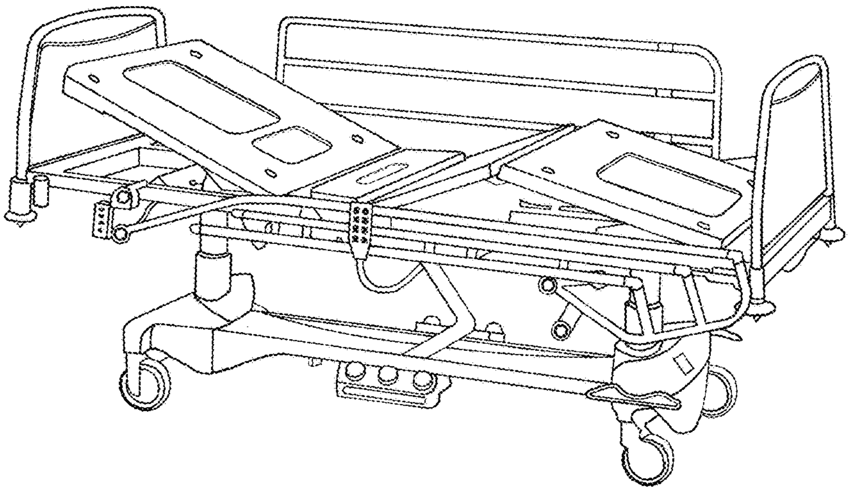
Figure 25:
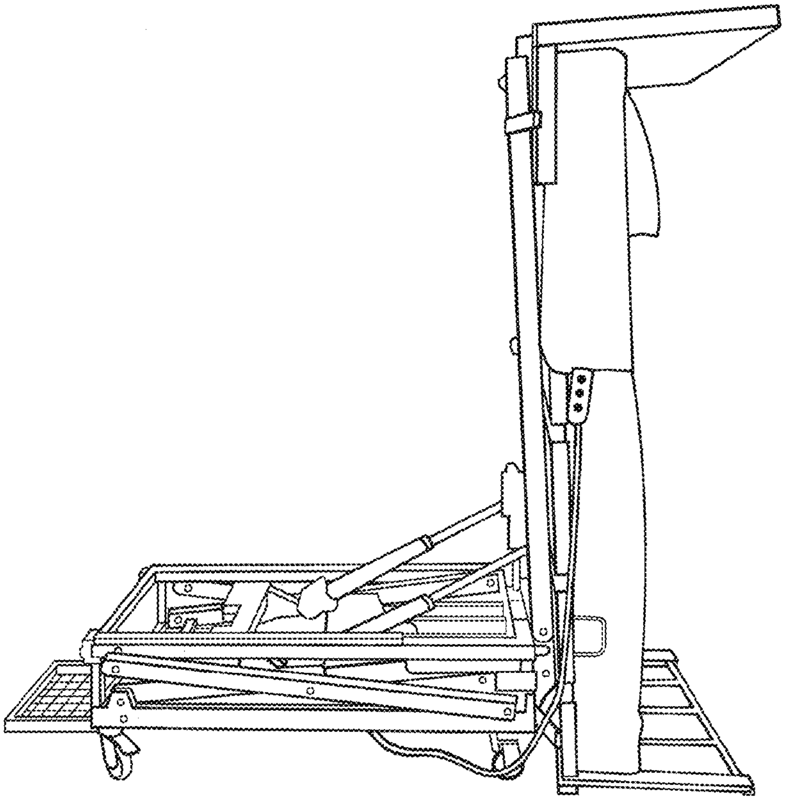
Figure 26:
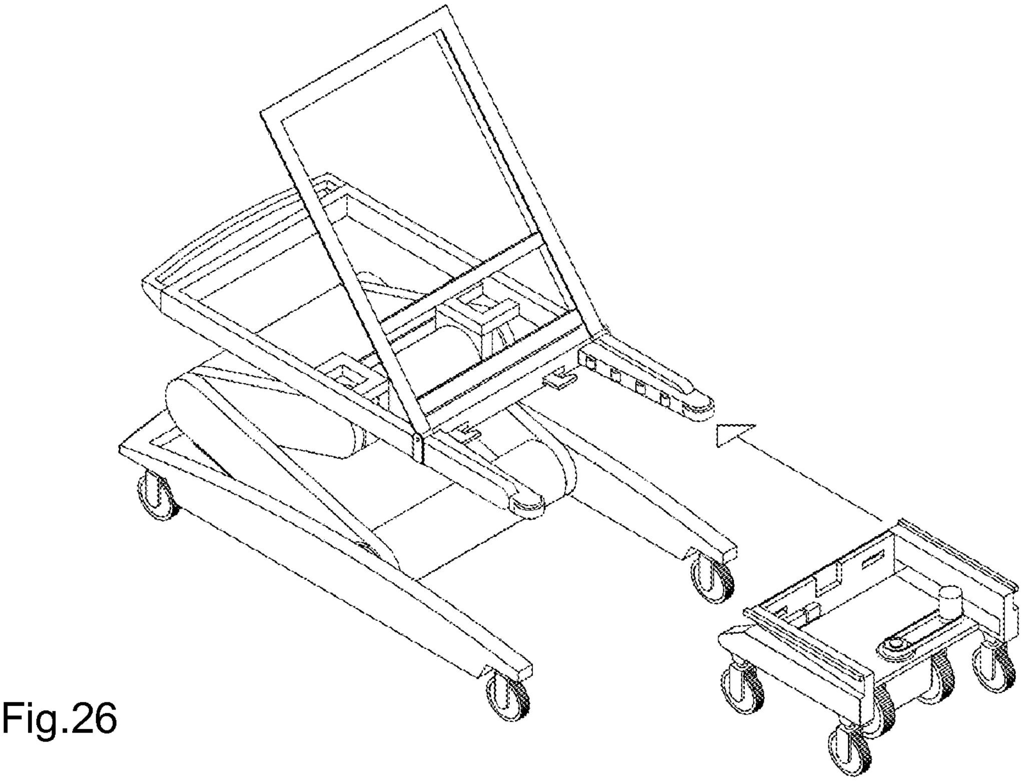
Figure 27:
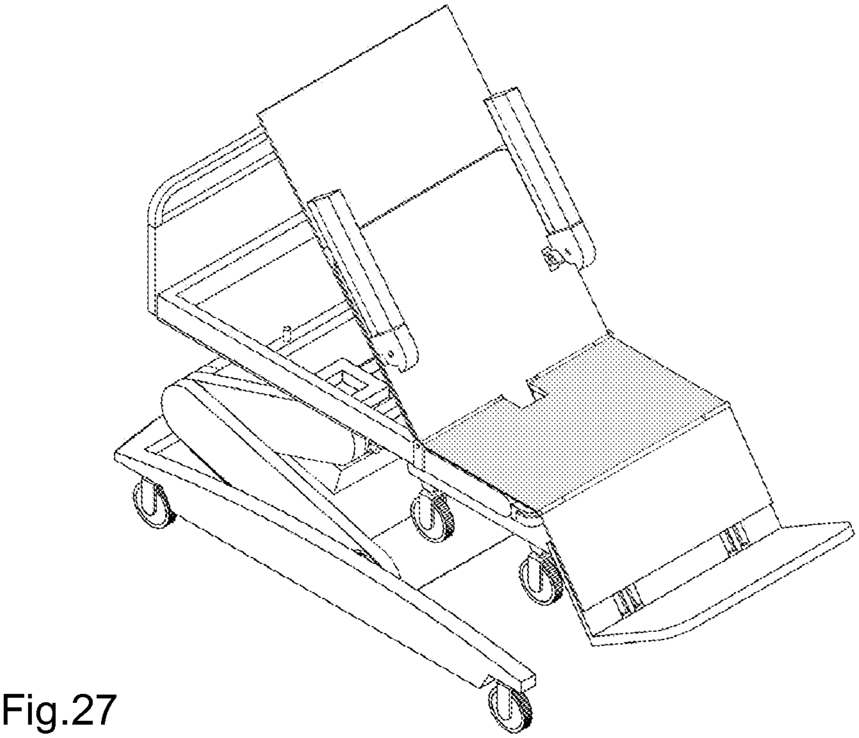
Figure 28:
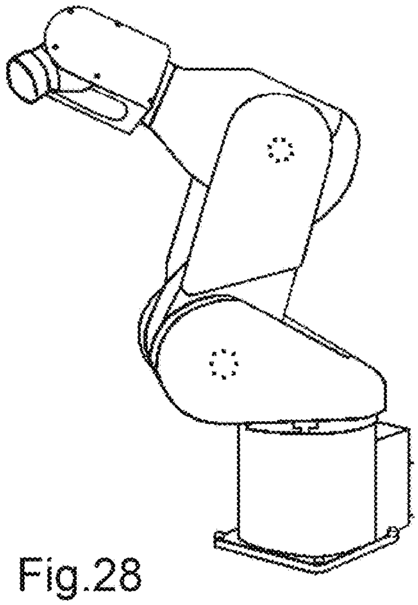
Figure 29:
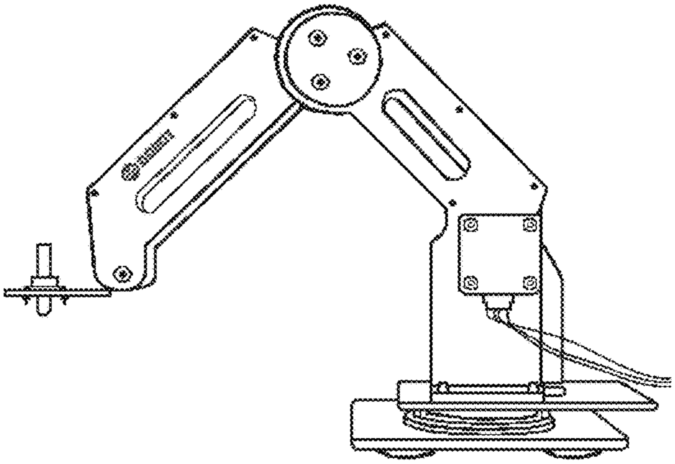

Adjustable beds are used in care and bed wards in hospitals, nursing homes, rest homes, rehabilitation centers and homes. The adjustment features of the beds range from simple, e.g. basic adjustments of the beds used in home care, to the functionally more demanding adjustment movements of the intensive care beds and their other advanced intelligent features in hospitals The adjustment mechanisms of adjustable beds can be divided into two functional category: Category 1: Adjustment mechanisms attached to the sleeping platform frame structure for adjusting the tilt positions of the back, pelvis, knee and foot section plates on the sleeping platform. The adjustments are performed either mechanically or electrically. The sleeping platform structure is supported by either a solid structured pedestal or legs or a height adjustable pedestal structure. See picture FIG. 24. Group 2: The sleeping platform structure of the bed and the adjustment mechanisms of the group 1 described above placed on top of it are supported by the height and tilt adjustment mechanisms of the sleeping platform frame structure of the bed. By combining the functions of the above-mentioned categories of the adjustment mechanisms, the different care positions and positions while staying in bed—sleeping positions in which the head end of the sleeping platform of the bed has been tilted up or down as well as various seating positions and the so-called stand-up position of the bed—can be implemented. The traditional support and adjustment mechanisms of the sleeping platform structure of the adjustable beds allow the following adjustment movements of the sleeping platform: The height adjustment of the sleeping platform structure of the bed from the lower height while staying in bed to the height of nursing treatments (FIG. 15*b* and FIG. 16), the longitudinal tilt adjustment of the sleeping platform structure to the so-called Trendelenburg and counter-Trendelenburg positions (FIG. 17 and FIG. 18) and the lateral tilt adjustment of the sleeping platform structure. Other known traditional adjustment solutions represents the so-called stand-up bed (FIG. 25). The adjustment mechanisms of the sleeping platform structures of the traditional adjustable beds consists of scissor lift mechanisms and the associated actuators (FIG. 22 and FIG. 23) placed under the sleeping platform structure and supported by the foot structure equipped with wheels or lifting columns used as a height adjustment mechanism of the sleeping platform structure of the bed (FIG. 24).

3. DISADVANTAGES OF PRIOR ART SOLUTIONS

Traditional beds are divided into types and models according to their different uses and suitability for different user groups, on which their manufacture and sale are also based. It is difficult to adapt the ergonomic features of the traditional bed solutions for different target groups to meet the changing functional needs of the future.

How to change, for example, a basic bed used in home care or nursing home to be more versatile in its adjustments as the moving ability of the bed user decreases over time. The adjustment mechanism solutions of the traditional beds do not include the ability to update the adjustment functions of the bed. In practice, most often the option is to buy a new bed. The operation of the adjustment mechanisms based on the scissor lift mechanisms or on the use of lifting columns used in traditional adjustable bed solutions, the height and longitudinal tilt adjustments of the sleeping platform structure—the Trendelenburg and the counter-Trendelenburg positions is limited by the structural dimensions of the scissor lift mechanisms and the lifting columns. The structural limitations of the adjustments are reflected in the functional properties of the beds themselves. Larger and more flexible trajectories than the traditional possibilities of the adjustment mechanisms of the sleeping platform structures would be an advantage e.g. in the demanding nursing work in hospitals. The traditional support and adjustment mechanisms of the sleeping platform structure do not, like the invention, allow a universal bed solution with all known adjustment movements of the bed. For example, the integration of the so-called stand-up bed function into a bed structure otherwise equipped with the most versatile adjustment functions, such as the advanced hospital beds, is not possible within the framework of the traditional adjustment mechanism solutions. However, for example in the care and bed wards of hospitals and various nursing and rehabilitation centers, as well as in homes, the stand-up function of a bed would be a very necessary feature to facilitate the work of nursing staff and caregivers as well as the self-reliance of bed users. The protection of the scissor lift mechanisms underneath the sleeping platform structures of the traditional beds is difficult to implement. For example, there may be small children in homes, that the person in bed may not notice while adjusting the bed independently.

4. FUNCTIONAL AND STRUCTURAL CHARACTERISTICS OF THE INVENTION

The characteristics of the invention are presented in the patent claim 1.

The Basic Idea of the Adjustable Pedestal Structure of the Invention:

The adjustable pedestal structure of the invention consists of the U-shaped foot structure (30) equipped with wheels and the three interconnected structural parts supported by the foot structure, of which the lower (1*a*) and the middle (1*b*) structural parts with a peripheral shape, consisting of the rotation cylinders (2, 4) and the lever arms (3, 7) fixedly connected to them, and the axles (13*b*, 13*c*) fixedly connected to the lever arms to opposite ends of the rotation cylinders and the U-shaped upper structural part (1*c*) which consists of the rotation cylinder (6) and the lever arms (5*a*) fixedly connected thereto. A fixed axle (13*a*) is attached to the foot structure of the pedestal. It is placed inside the rotation cylinder (2) of the lower structural part (1*a*) of the pedestal structure. The sleeping platform frame structure (31) of the bed is connected to the lever aims (5*a*) of the upper structural part (1*c*). The structural parts of the adjustable pedestal structure are connected to each other by means of rotation cylinder structures and axle structures placed inside them. They form the connecting and rotation mechanisms of the structural parts. The rotation cylinders act as electrically operating adjustment mechanisms of the structural parts. The sleeping platform frame structure of the bed is adjusted in the vertical direction by means of the adjustment movements of the rotation cylinders (2, 4) and the lever arms (3, 7) connected to them of the lower and middle structural parts (1*a*, 1*c*) of the pedestal structure and the longitudinal tilt position of the sleeping platform structure of the bed is adjusted by means of the adjustment movements of the rotation cylinder (6) and the lever aims (5*a*) connected to it of the upper structural part of the pedestal structure. The adjustment movements of the rotation cylinders are assisted by the gas springs (26, 27, 28) connected to the lever arms of the structural parts of the pedestal structure. The gas springs significantly reduce the load on the structural parts of the pedestal and its electrically operating moving mechanisms. The lower and middle structural parts (1*a*, 1*b*) with a peripheral shape connected to the foot structure (30) of the pedestal and to each other and the connecting and cover plates (8, 9) attached to their lever arms (3, 7) stiffen the pedestal structure laterally. The width of the foot structure (30) of the adjustable pedestal structure, which is larger than the width of the sleeping platform frame structure of the bed and the U-shaped structure, which is open at the foot end of the bed, allows the so-called stand-up position of the bed.

Figure 2:
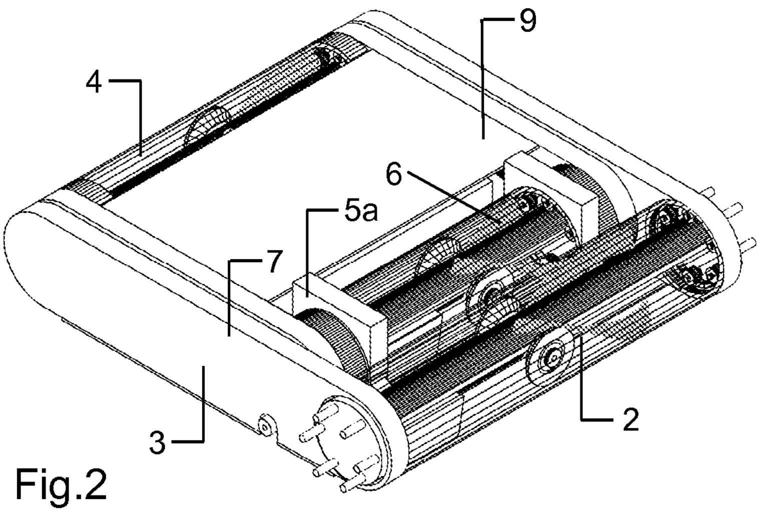
Figure 3:
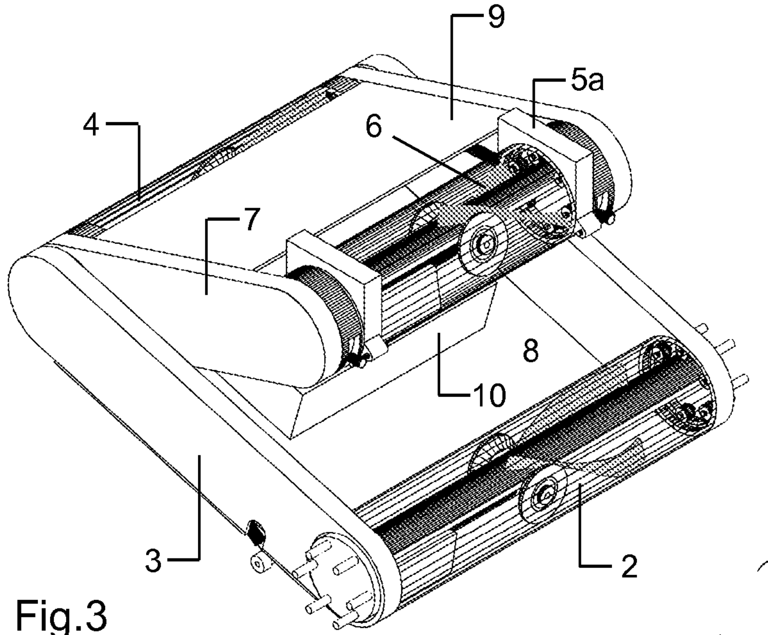
Figure 4:
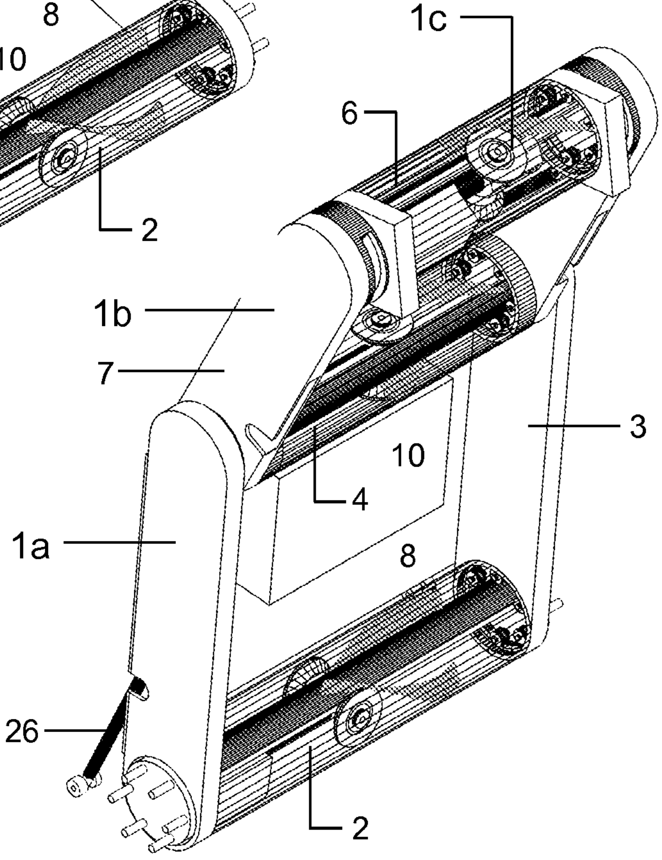
Figure 8:
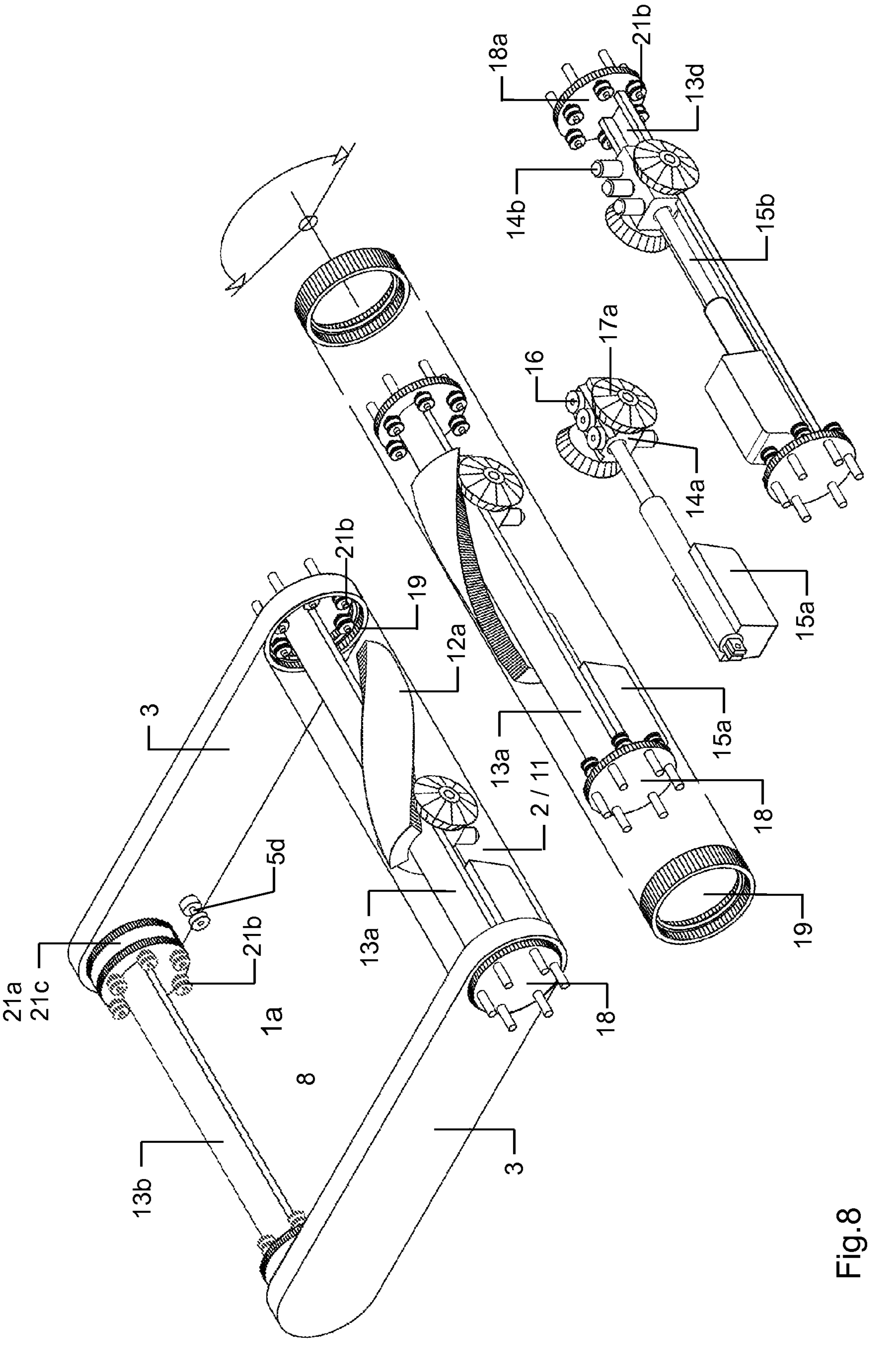
Figure 9:
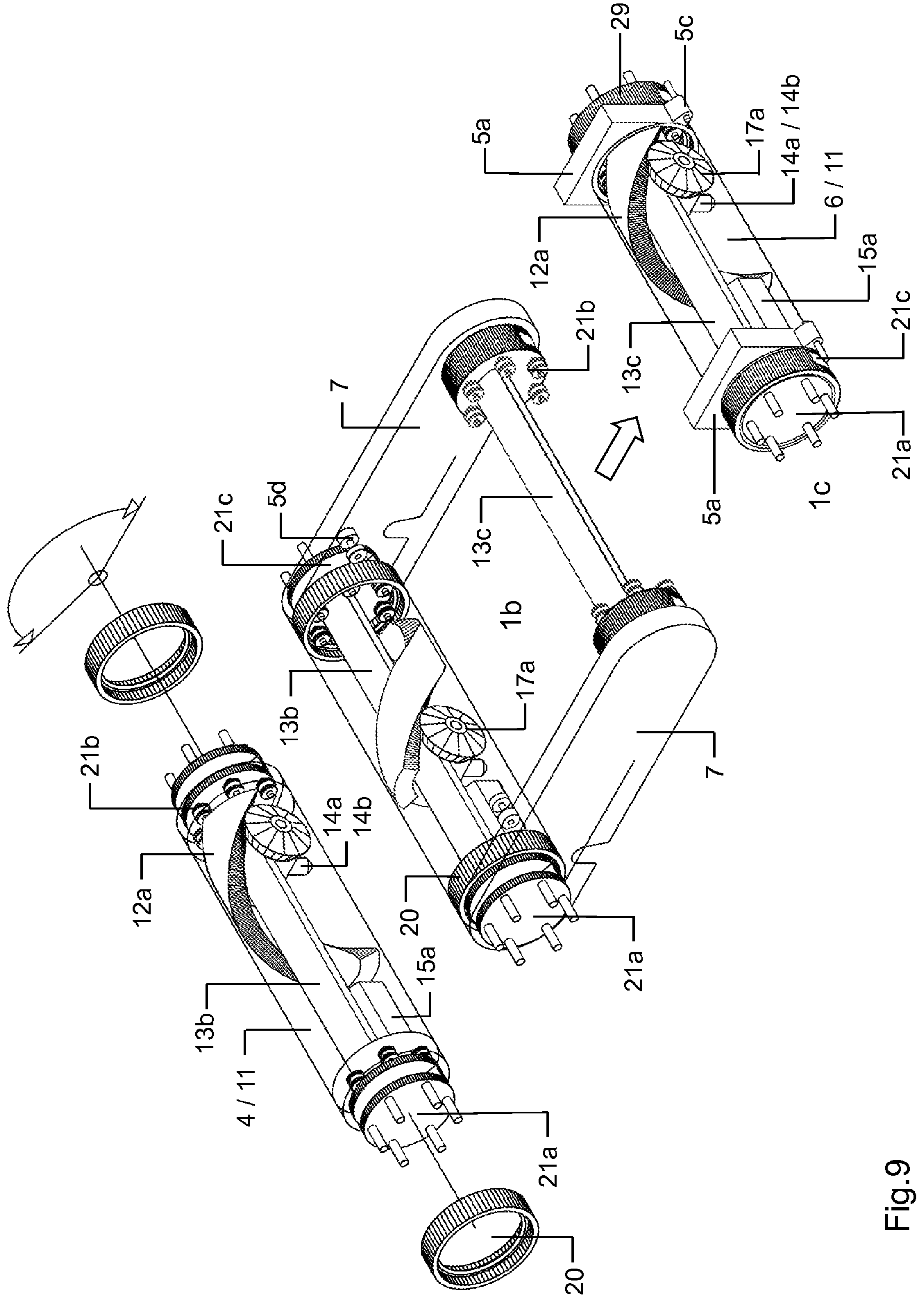
Figure 10:
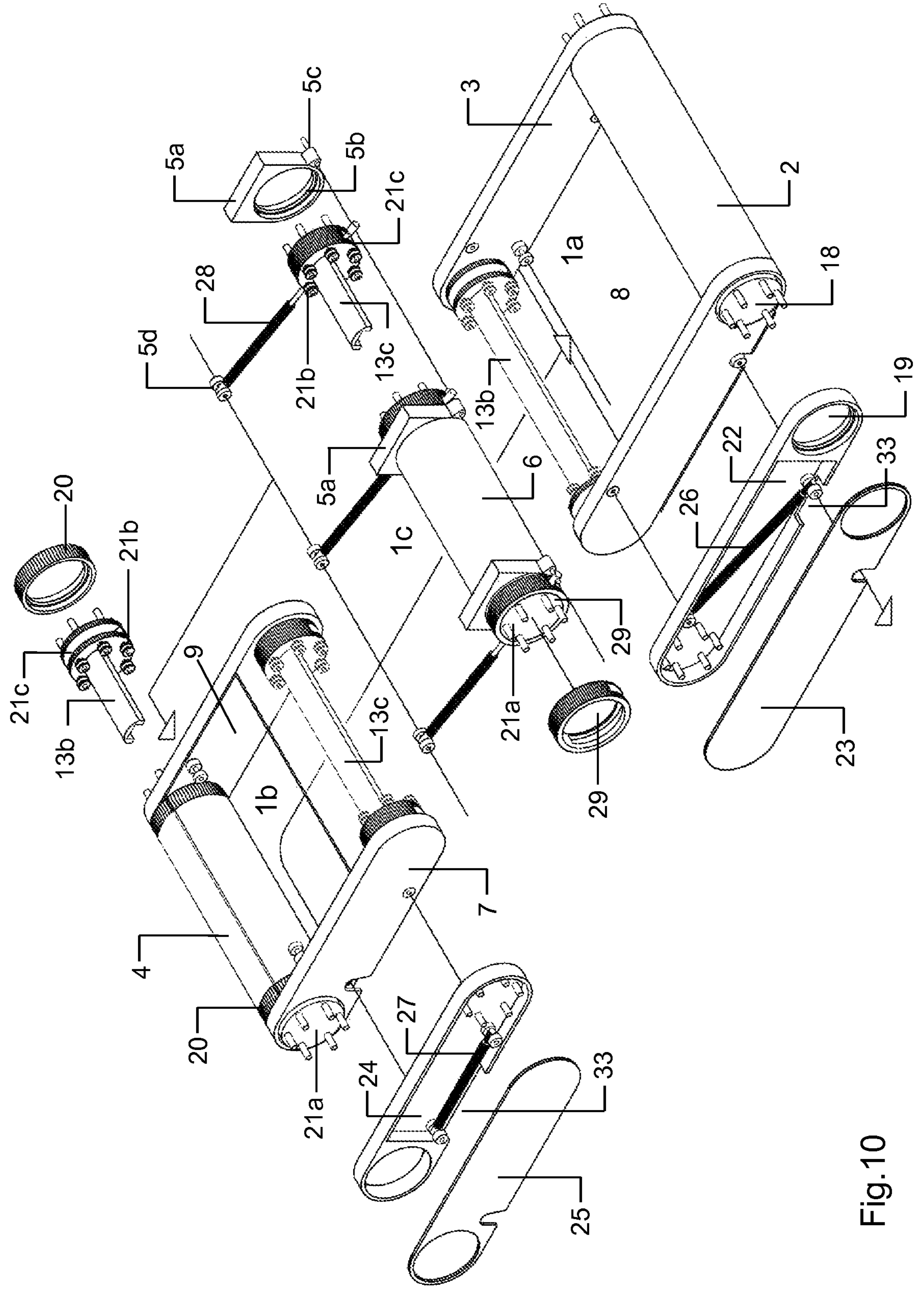
Figure 13A:
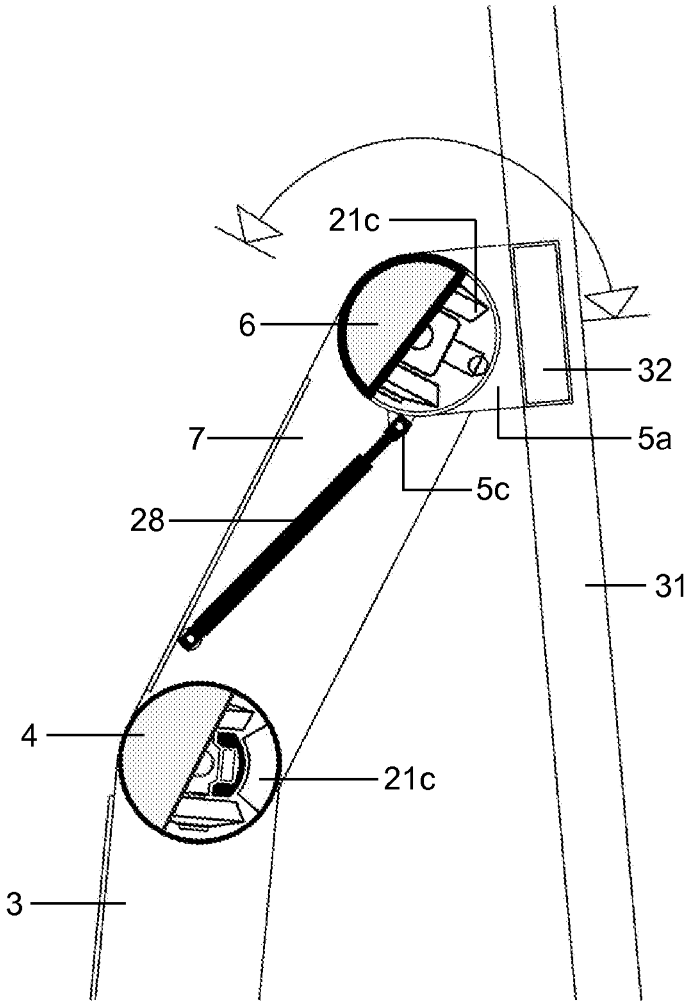
Figure 13B:
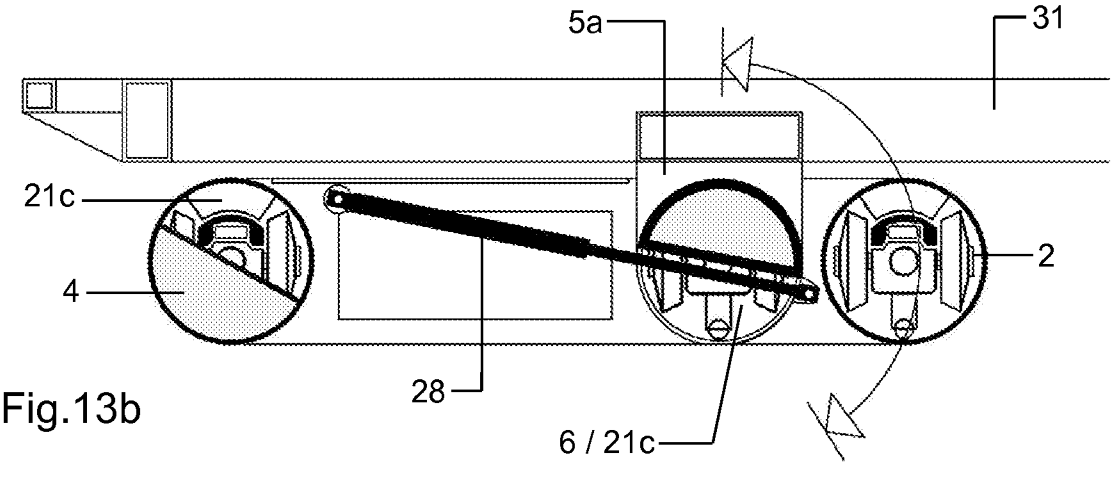
Figure 14A:
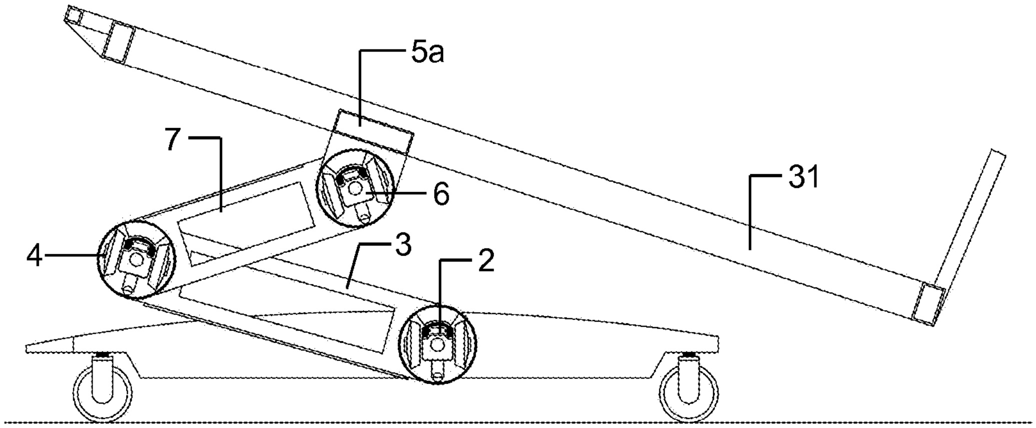
Figure 14B:
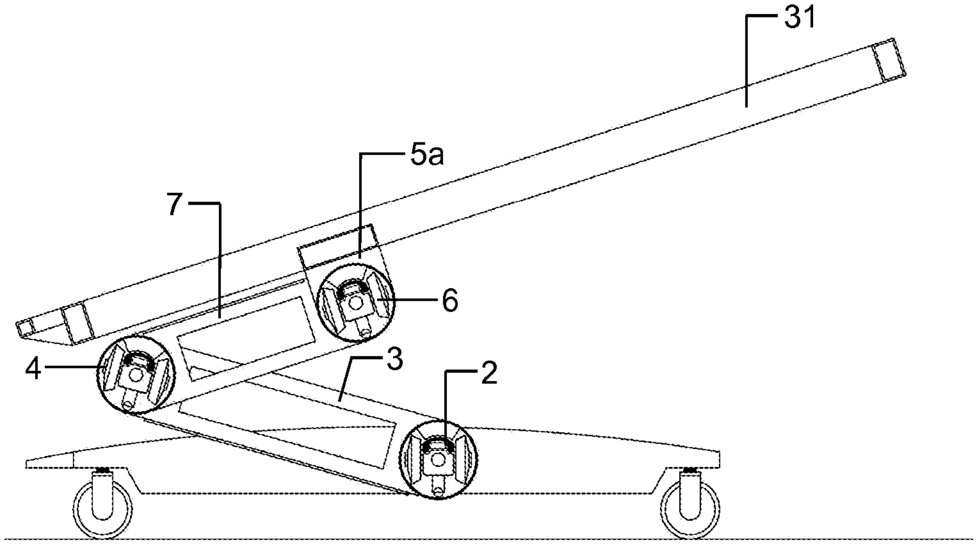
Figure 14C:
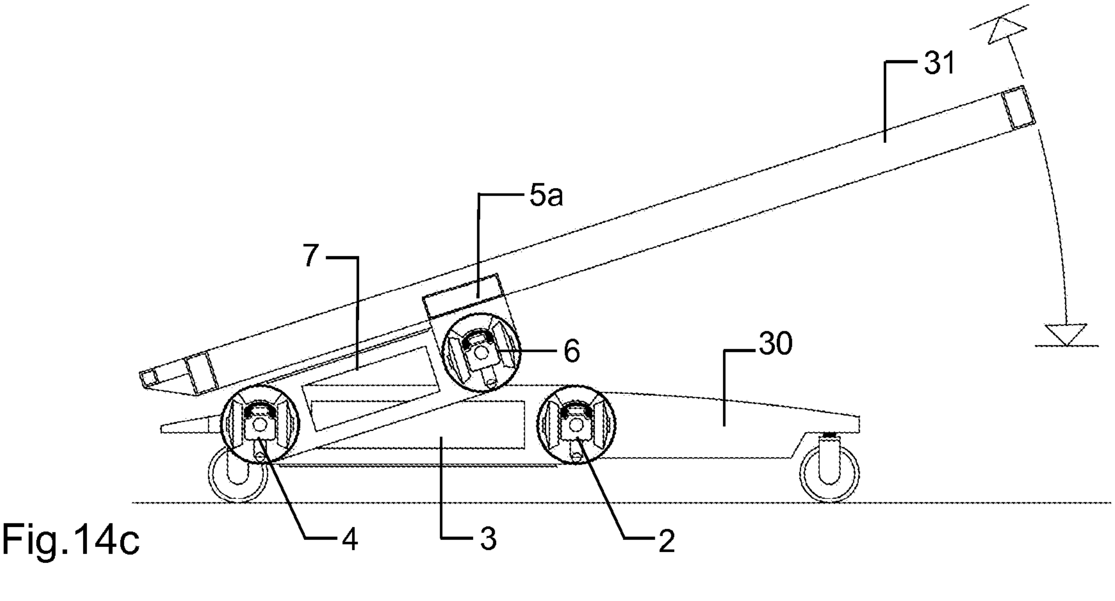

The invention will be described in the following using examples with reference to the accompanying drawings, in which, FIGS. 1*a* and 1*b* show the structural parts (1*a*, 1*b*, 1*c*) of the adjustable pedestal structure of the bed of the invention. FIGS. 2, 3 and 4 show the structure of the rotation cylinders (2, 4, 6) of the structural parts (1*a*, 1*b*, 1*c*) of the adjustable pedestal structure and the position of the lever arms (3, 7, 5*a*) connected to them when the pedestal structure is in its lowest position, at the treatment height position and in the so-called stand-up bed position. FIGS. 8, 9 and 10 show the structure of the structural parts (1*a*, 1*b*, 1*c*) of the adjustable pedestal structure, as well as the connection of the gas springs (26, 27, 28) to the lever arm structures (3, 7, 5*a*) of the structural parts. FIGS. 11*a*-11*c* and 12*a*-12*c* show the positioning and trajectories of the gas springs (26, 27, 28) connected to the structural parts (1*a*, 1*b*, 1*c*) of the adjustable pedestal structure in different adjustment positions of the pedestal structure FIGS. 13*a* and 13*b* show the positions of the gas springs (28) connected to the upper structural part (1*c*) and the grooves (21*c*) in the mounting flanges of the axle (13*c*) located inside the rotation cylinder (6) in different extreme adjustment positions of the pedestal structure. FIGS. 14*a*-14*c* show the positions of the structural parts (1*a*, 1*b*, 1*c*) of the adjustable pedestal structure when the sleeping flatform frame structure (31) of the bed is in the so-called treatment height and in its lowest height position, and the tilt positions of the sleeping flatform frame structure in the Trendelenburg and counter-Trendelenburg positions.

Figure 5:
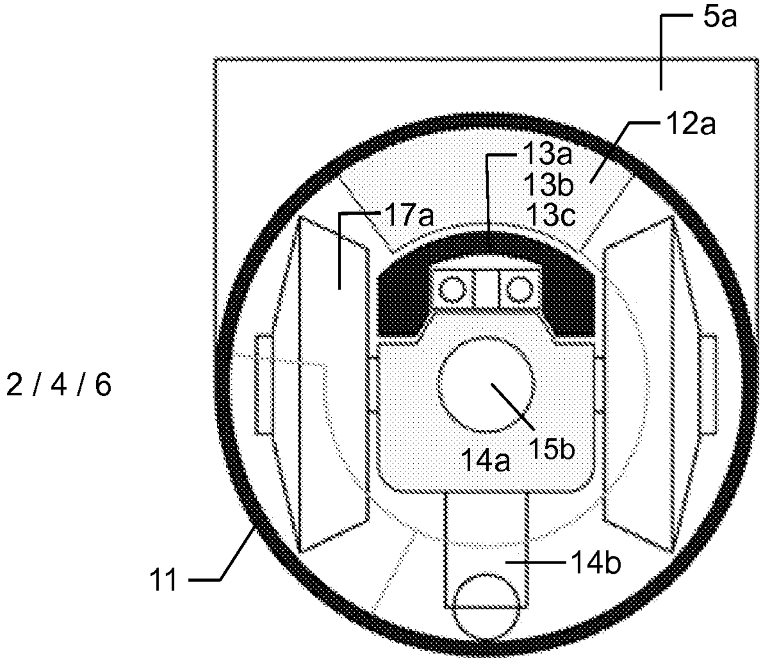
Figure 6:
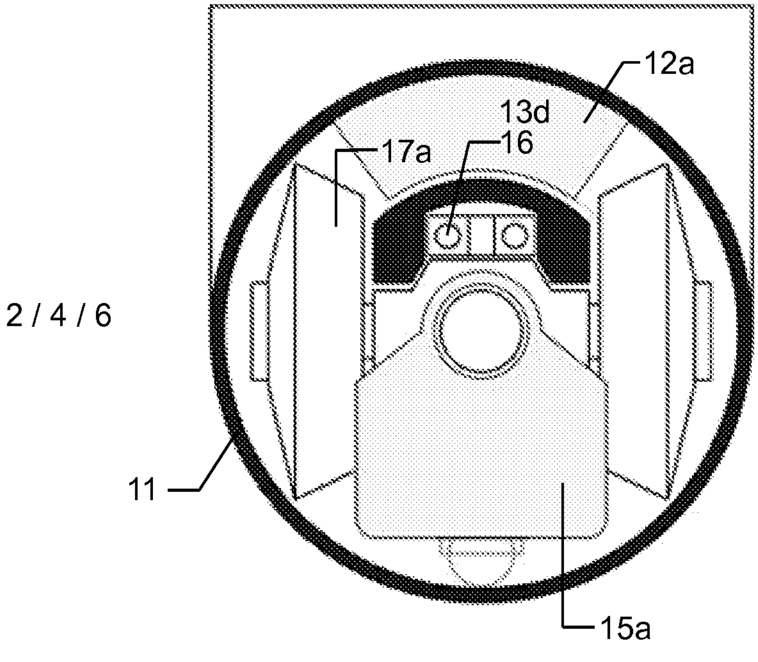
Figure 7:
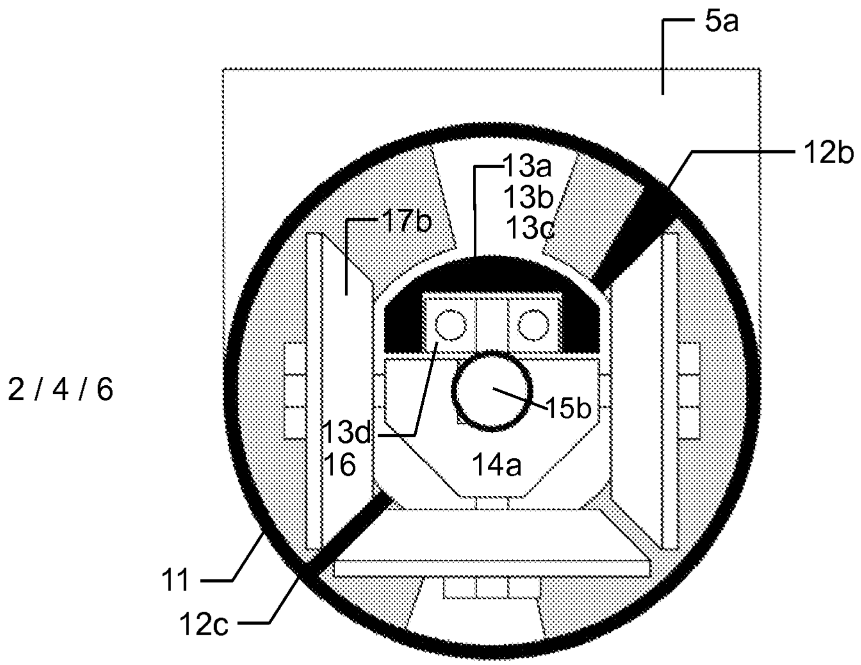

The Structural Solution of the Adjustable Pedestal Structure of the Bed of the Invention:

In connection with the above description of the basic idea of the invention, the formation of the structural parts (1*a*, 1*b*, 1*c*) of the adjustable pedestal structure has been presented. See also FIG. 1*b*. The rotation cylinders (2, 4, 6) of the structural parts of the adjustable pedestal structure and the lever arms (3, 7, 5*a*) connected thereto, and the axles (13*b*, 13*c*) connected to the lower (1*a*) and middle (1*b*) structural parts of the pedestal structure form unitary structures which are adjusted around the axle located inside the rotation cylinder of each structural part and the axles being connected to the end of the lever aims of the structural part, in the vertical order of the stand-up position of the sleeping platform structure, lower as the structural part in question or around the axle connected to the foot structure. See FIG. 11*a*. The connecting and rotation mechanism between the rotation cylinder (2, 4, 6) and the solid axle (13*a*, 13*b*, 13*c*) inside it of each structural part of the adjustable pedestal structure, is formed by the grooved ball bearings (21*b*) connected to the mounting flanges (18*a*, 21*a*) at the ends of the axle and the inner guide rings (19, 20) attached to the ends of the rotation cylinder and connected to the frame structures of the lever arms (22, 24). The operation of the adjustment movements of the rotation cylinders of the adjustable pedestal structure of the bed of the invention is based on converting the linear motion of the adjusting actuators into a rotation movement by which the movements of the lever arms (3,7,5*a*) of the structural parts of the pedestal structure (1*a*, 1*b*, 1*c*) are adjusted to the different positions of the sleeping platform frame structure of the bed (31). The wide spiral flange (12*a*) or the narrow spiral flanges (12*b*, 12*c*) are connected to the inner surface of the frame tube (11) of the rotation cylinder of the adjustable pedestal structure. The adjustment actuator of the rotation cylinder is supported on the mounting flange (18*a*, 21*a*) of the fixed axle (13*a*, 13*b*, 13*c*). The spindle of the linear actuator (15*b*) pushes and pulls the pushing wheels (17*a*, 17*b*) attached to the connecting module (14*a*) of the spindle of the actuator, pushing wheels and the guide bearings of the spindle (16) in the direction parallel to the axle, so that the force forward and backward directed to the spiral flanges causes the rotation movement of the rotation cylinder around the axle. The structural solution of the rotation cylinders is shown in the pictures FIG. 5, FIG. 6 and FIG. 7. The connection of the structural parts (1*a*, 1*b*, 1*c*) of the pedestal structure to each other and to the foot structure (30) of the pedestal and to the sleeping platform frame structure (31) of the bed is shown in connection with the picture FIG. 11*a*.

The Adjusting Motors of the Rotation Cylinders of the Adjustable Pedestal Structure of the Bed of the Invention:

Only low-voltage electric motors can be used in adjustable beds. The alternatives are motors, whose operation is based on the rotating movement of the axle or actuators based on linear motion. Low-voltage DC, AC and servomotors, etc. are used in the control mechanisms of various small machines and devices, for example, small robot arms. The power of the motors can be increased by gearboxes and the rotation movement of the axle be converted to linear motion by means of ball screws or the like. However, the power of these motors is not high enough for use with the adjustable pedestal structure solution of the bed of the invention. Due to its operating voltage, high power and speed of motion, the linear actuator is optimally suitable as the motor used in the adjustable pedestal structure of the bed of the invention.

Figure 30:
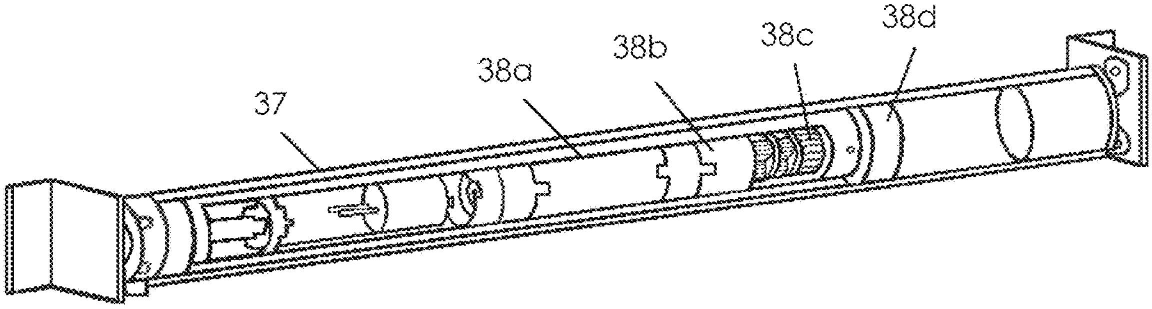
Figure 31:
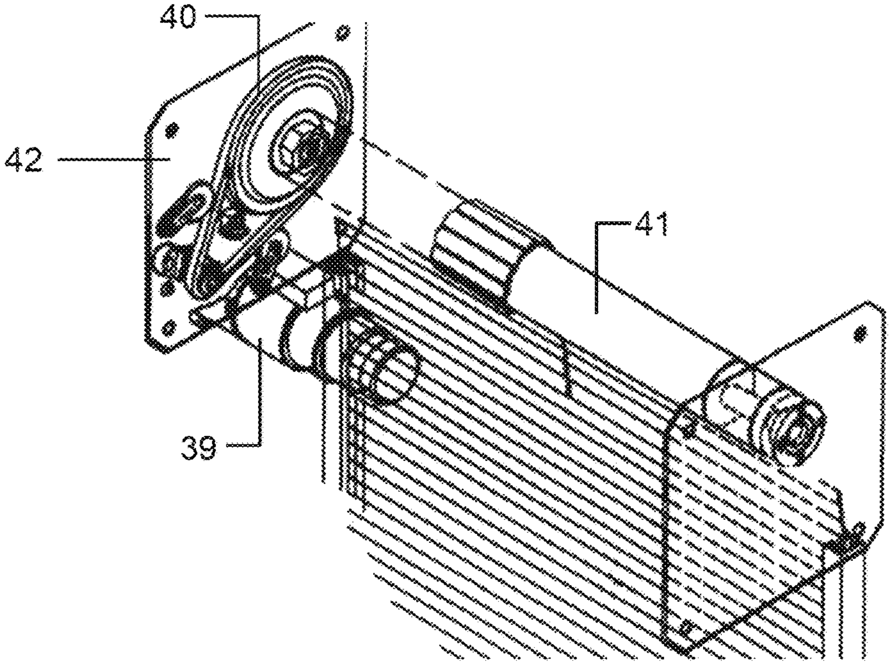

Linear actuators provide safe, quiet and reliable adjustment movements thanks to their precise motion control. The adjustment movement of the linear actuators is transmitted via the rotation cylinder structures of the invention to the lever arms of the structural parts of the adjustable pedestal which support and move the sleeping platform frame structure of the bed. Linear actuators are commonly used in the scissor lift mechanism structures and lifting columns of the traditional adjustable beds. See pictures FIG. 22-FIG. 25. The rotation cylinder structure acts as the adjustment mechanism for the structural parts of the pedestal structure of the invention. Its operation is based on the structurally simple moving mechanism solution consisting of the linear actuator and the wide spiral flange (12*a*) or the narrow spiral flanges (12*b*, 12*c*) attached to the inner surface of the frame tube (11) of the rotation cylinder. Utilizing the varying lengths and density of the threads of the spiral flanges and standard strokes and speeds of the linear actuators, the desired speed of the adjustments of the structural parts (1*a*, 1*b*, 1*c*) of the pedestal structure of the invention, as well as the individual speed of movements used in various applications of the moving mechanism solution in question, are achieved. The number of the spiral flanges as described in this description may increase from one or two to more and the number of the pushing wheels (17*a*, 17*b*) placed in the rotation cylinder structure may increase accordingly depending on the application. Closest to the functional principle of the rotation cylinder solution of the adjustable pedestal structure of the invention are the tubular motors. Their lightweight low-voltage applications are used for example in the sunscreen curtains. The construction of the tubular motor is shown in connection with the picture FIG. 30. Low-voltage tubular motors (39) capable of handling higher loads are used, for example, in roll-up door mechanisms in garages. See picture FIG. 31. However, only the structural applications of the known tubular motors operating at 230V voltage/mains power would be strong enough to be used in the pedestal structure solution of the invention. The rotation cylinder structure of the adjustable pedestal structure of the invention, in which the adjustment movement of the linear actuator is converted into rotational adjustment movement, forms a new type of low-voltage adjustment mechanism solution with great power/torque performance comparable to conventional tubular motor applications using more powerful DC, AC, and servo motors, etc. using 230V operating voltage and the operating principle of which the solution of the invention is compared with in this context. This offers new applications and possibilities of use for various machines and devices that previously have been operating at 230V voltage in locations where their control motors have to operate at low-voltage.

The Adjustments of the Adjustable Pedestal Structure of the Invention:

The electrically operated adjustments of the adjustable pedestal structure of the invention and the operation of the safety mechanisms are implemented by means of logic control. The adjustment functions of the adjustable pedestal structure can be selected individually according to the different locations of use of the beds and their different user groups: All vertical and tilting position adjustments of the sleeping platform structure made possible by the pedestal structure can be taken into use, for example, in care beds in hospitals that are adjusted by the nursing staff, or for safety reasons only some of them or by limiting the trajectories of their adjustments, for example, in homes where the users of the beds also independently perform the adjustments of the bed. The adjustment functions of the adjustable pedestal structure are complemented by the back, pelvis, knee and foot section plates attached to the sleeping platform structure of the bed which complement the ergonomics of the bed. The control of the adjustments of them is done, for example, by means of the control panel attached to the bed railing structure or by the hand control. See picture FIG. 24. The logic control unit (10) of the actuators of the pedestal structure is located in the lower structural part of the pedestal structure (1*a*). Using the control panel also the settings for the adjustments of the pedestal structure can be set or changed, such as the maximum height position of the sleeping platform structure of the bed required in each location of use or the maximum tilt angle used for the Trendelenburg and counter-Trendelenburg positions. See pictures FIG. 16-FIG. 18. The display panel for the linear actuators placed in the rotation cylinders of the structural parts of the adjustable pedestal structure and for the motors used in the above-mentioned adjustments of the sleeping platform of the bed and the electrical connection to the bed structure (34) is placed in the foot structure (30) of the pedestal structure. The display panel shows the operation of the adjusting motors and the safety mechanisms of the bed structure and their possible fault codes. See FIG. 19. The adjustment movements of the rotation cylinders (2, 4, 6) of the bed of the invention and the lever arms (3, 7, 5*a*) attached thereto take place in such a way that either they all are adjusted at the same time, or that the rotation cylinder and the lever arms of only one structural part of the pedestal structure move alone, or that the rotation cylinders and lever arms of two structural parts move together at the same time, whereby the height and tilt positions of the sleeping flatform structure of the bed are achieved according to each situation of nursing treatment and while staying in bed or it is finished by means of flexible adjustment movement series of the structural parts of the pedestal structure.

Safety of Use of the Adjustable Pedestal Structure of the Invention:

Safety mechanisms that cover all adjustment movements of the bed structure can be placed in a simple way in the structural parts (1*a*, 1*b*, 1*c*) of the adjustable pedestal structure of the bed of the invention, as well as in the sleeping platform frame structure of the bed (31): The safety sensors placed in the lever arms (3 and 7) of the structural parts of the adjustable pedestal structure and in the sleeping platform frame structure stop the downward adjustment movement in the event of an obstacle. The precise movement of the linear actuators locks the pushing wheels (17*a*, 17*b*) that move the wide spiral flange (12*a*) or the narrow spiral flanges (12*b*, 12*c*) at the end of the adjustment movement so that the rotation cylinders and the lever arms connected to them do not move. The bed structure stays steadily and without swaying in its adjusted position. Linear actuators do not move in case of a failure and therefore the adjustable pedestal structure can under no circumstances collapse. The power of the available standard linear actuators is much larger as the power needed to move the lever arms of the adjustable pedestal structure of the bed of the invention, the need for which is the total weight of the various types of sleeping platform structure solutions supported by the pedestal structure and the person in bed. The linear actuators acting as adjusting motors for the rotation cylinders (2, 4, 6) are assisted by the gas springs (26, 27, 28), connected to the structural parts of the adjustable pedestal structure, the placement and operation of which will be described later. They significantly reduce the load on the linear actuators and the structures of the rotation cylinders. The gas springs also serve as safety mechanisms of the adjustable pedestal structure and prevent the sleeping platform structure from descending suddenly in the event of a failure, which, however, is not possible for the above-mentioned reason in connection with the adjustable pedestal structure of the invention due to the structural properties of the reliable linear actuators used therein. The operating voltage of the linear actuators used in the pedestal structure and the other electrical components and devices in the bed structure is 12/24V. The adjustable pedestal structure of the invention is a lifting device with essential safety requirements, as well as also the height adjustment mechanisms of the other adjustable beds. The adjustable pedestal structure of the bed of the invention is capable to meet the international safety requirements set for it.

The Speed of Motion of the Lever Arms Connected to the Rotation Cylinders:

Thanks to the utilization of the standard linear actuators and the structurally simple spiral flange solution of the invention, the implementation of the individual speed of motion of the lever arms (3, 7, 5*a*) of the structural parts of the adjustable pedestal structure of the bed of the invention becomes simple: The speed of the adjustment movement of the lever arms is based on the speed and stroke of the standard linear actuator inside each rotation cylinder, as well as the length and density of the threads of the wide spiral flange (12*a*) or the narrow spiral flanges (12*b*, 12*c*) connected to the inner surface of the frame tube (11) of the rotation cylinders, which vary individually in each rotation cylinder. Each rotation cylinder (2, 4, 6) of the structural parts (1*a*, 1*b*, 1*c*) of the adjustable pedestal structure and the lever arms (3, 7, 5*a*) connected thereto have their own independent speed of motion. For the various applications of the rotation cylinder solution of the adjustable pedestal structure of the invention, the speed of motion of the lever arms suitable for each application can be implemented as described above. Converting the movement of the linear actuator into the rotational movement of the rotation cylinder by means of the pushing wheels (17*a*, 17*b*) attached to the spindle of the actuator, and the wide spiral flange (12*a*) or the narrow spiral flanges (12*b*, 12*c*) attached to the inner surface of the frame tube (11) of the rotation cylinder requires part of the power of the linear actuator. However, the power required to convert the adjustment movement does not substantially reduce the torque of the rotation cylinders. The construction and operation of the rotation cylinders is shown in connection with the pictures FIG. 5, FIG. 6 and FIG. 7. The pictures FIG. 11*a*-11*a* and FIG. 14*a*-14*c* show the basic positions of the lever arms (3, 7, 5*a*) of the structural parts (1*a*, 1*b*, 1*c*) of the pedestal structure of the bed of the invention in various adjustment positions of the sleeping platform frame structure (31).

Description of the Adjustment Movements of the Adjustable Pedestal Structure of the Invention:

The Adjustment of the Height Position of the Sleeping Platform Structure:

The speed of movement of the lever arms of the lower structural part (3) and middle structural part (7) of the adjustable pedestal structure of the bed of the invention, which slightly differ from each other, is carried out in such a way that, when the adjustment takes place from the lowest height position of the sleeping platform frame structure of the bed (31) (FIG. 11*c* and FIG. 15*b*) to the so-called height of nursing treatments (FIG. 11*b* and FIG. 16), the sleeping platform frame structure moves perpendicularly upwards along the rising axis (36) of the structural parts of the adjustable pedestal structure shown in the pictures. If the speed of the movement of the lever arms (3, 7) of the lower and upper structural parts of the adjustable pedestal structure were the same, it would during the height adjustment movement of the sleeping platform frame structure create a situation where the sleeping platform frame structure would also move horizontally in the longitudinal direction of the bed towards the head section of the sleeping platform. The lateral movement is small, yet functionally disruptive. The problem is eliminated by the implementation of the individual speeds of motion between the rotation cylinders. The maximum height position of the sleeping platform of the bed supported by the adjustable pedestal to be used can be chosen freely. Depending on the location of use or on the operational situation, it can be considerably larger than what is possible with traditional adjustable beds.

Figure 19:
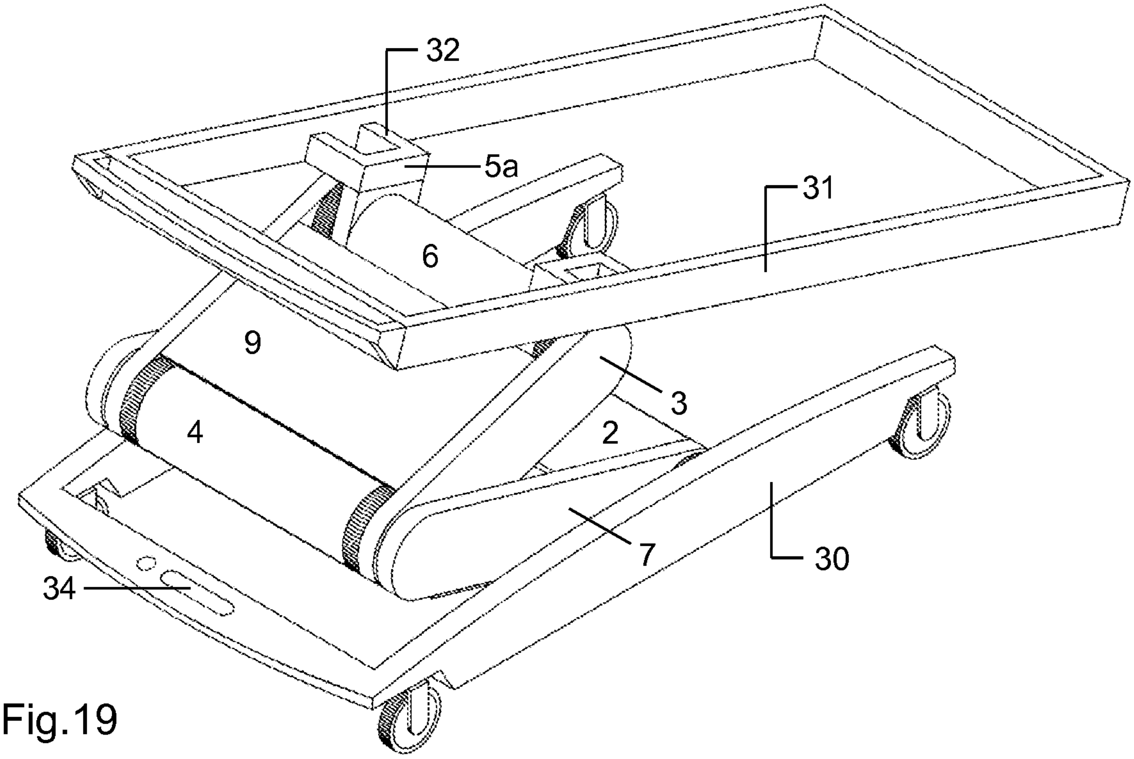
Figure 20:
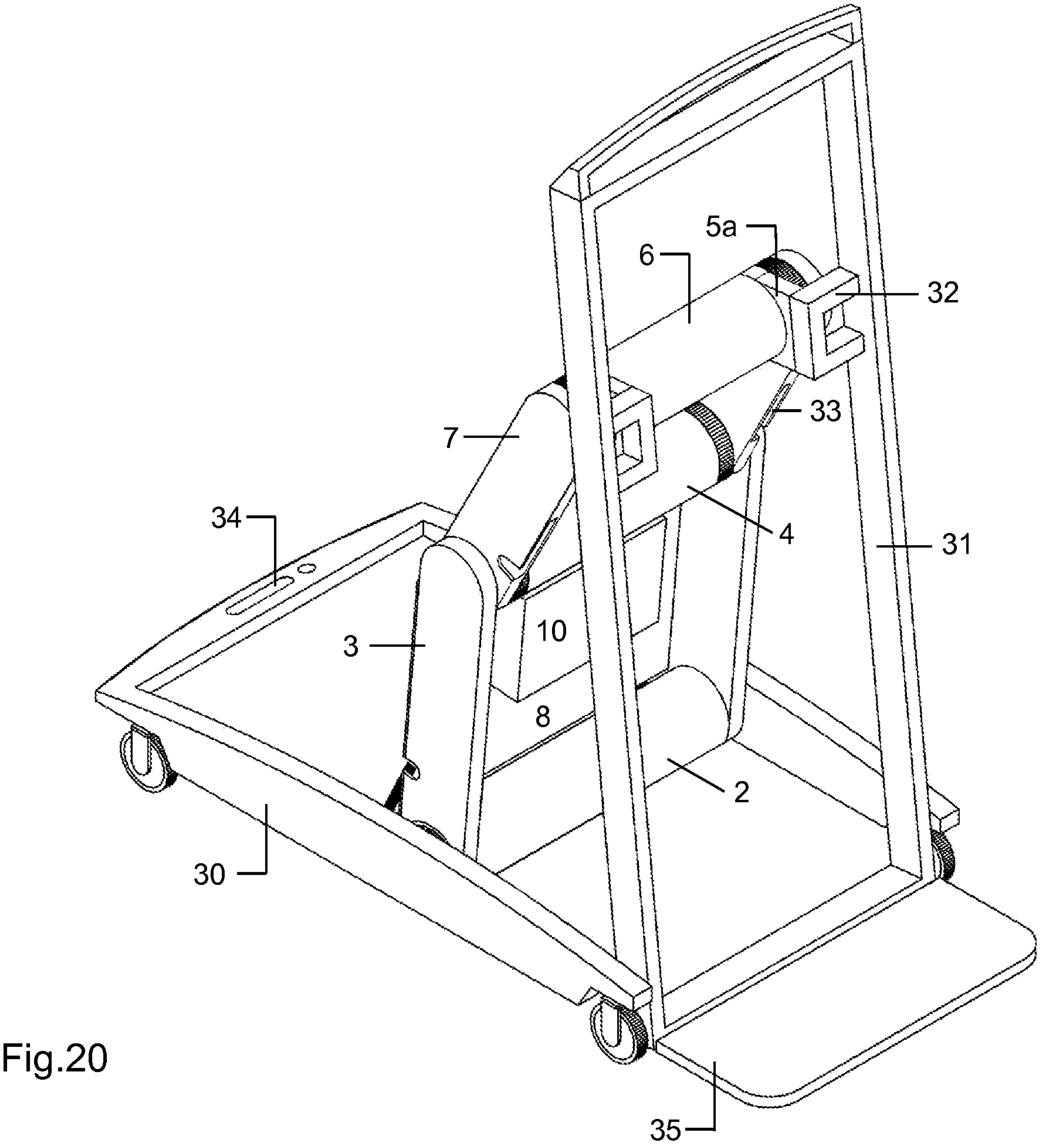

The Trendelenburg and Counter-Trendelenburg Adjustments of the Sleeping Platform Structure of the Bed:

The Trendelenburg tilt angle adjustment of the sleeping platform structure of the bed is made flexible by the possibility of the individual adjustment of the operation of the linear actuators of the rotation cylinders of the adjustable pedestal structure. In connection with the Trendelenburg and counter-Trendelenburg adjustments, the maximum tilt angle and height position of the sleeping platform frame structure of the bed can be selected by means of the independent adjustment movements of the different structural parts (1*a*, 1*b*, 1*c*) of the adjustable pedestal structure, appropriate in accordance with the different operational situations. The adjustment of the tilt angles of the Trendelenburg position can be carried out in all different height positions of the sleeping platform structure, see pictures FIGS. 14*c* and 14*b*. The tilt angle of the Trendelenburg position can flexibly be adjusted to the desired position by means of the adjustment movement of the lever arms (5*a*) of the upper structural part of the adjustable pedestal structure, for example, from the horizontal position shown in the picture FIG. 11*b* to the tilt angle position shown in the picture FIG. 14*b* and further be increased by the adjusting movement of the middle structural part (1*b*) of the pedestal structure. In the pictures the rotational adjustment movement in question happens counter-clockwise. Completion of the counter-Trendelenburg position of the sleeping platform structure is carried out in a similar way by means of the adjustment movement of the lever arms (5*a*) of the upper structural part of the adjustable pedestal structure, but the rotation movement of the lever arms happens to opposite direction then. The adjustment of the counter-Trendelenburg position, when the sleeping platform structure of the bed is at its lowest elevation, requires the lower and middle structural parts of the adjustable pedestal structure to be adjusted slightly higher, as well as the adjustment movement of the lever arms of the upper structural part of the pedestal structure clockwise in the pictures, after which the tilt angle of the counter-Trendelenburg position of the sleeping platform structure of the bed can be further increased while its height position increases by means of the adjustments of the lower and middle parts of the adjustable pedestal structure. The largest counter-Trendelenburg position of the sleeping platform structure (31) is the so-called stand-up position of the bed, see the pictures FIG. 11*a* and FIG. 20. The positions of the structural parts of the pedestal structure in the Trendelenburg and counter-Trendelenburg positions of the sleeping platform structure of the bed are shown in the pictures FIG. 14*a*-FIG. 14*c* and FIG. 17-FIG. 19. Activation of the selected largest tilt angle positions of the Trendelenburg and counter-Trendelenburg positions of the sleeping platform structure is effected by changing the settings of the logic control that controls the adjustments of the rotation cylinders.

Figure 11A:
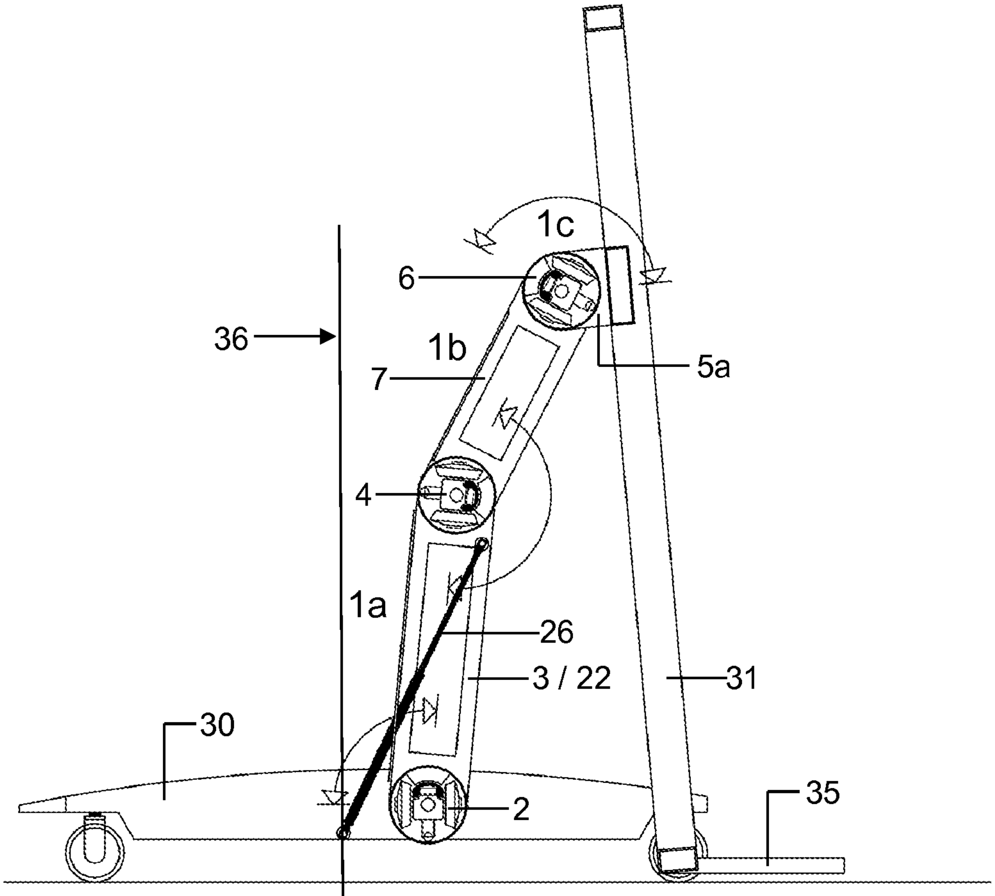
Figure 11B:
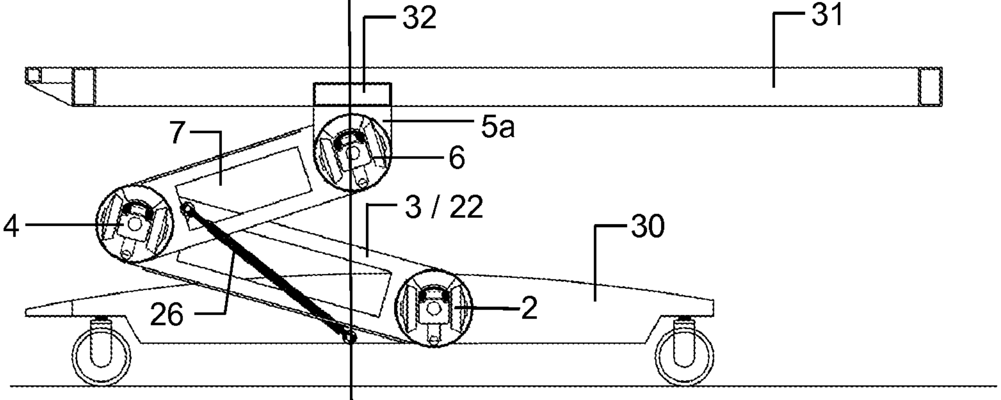
Figure 18:
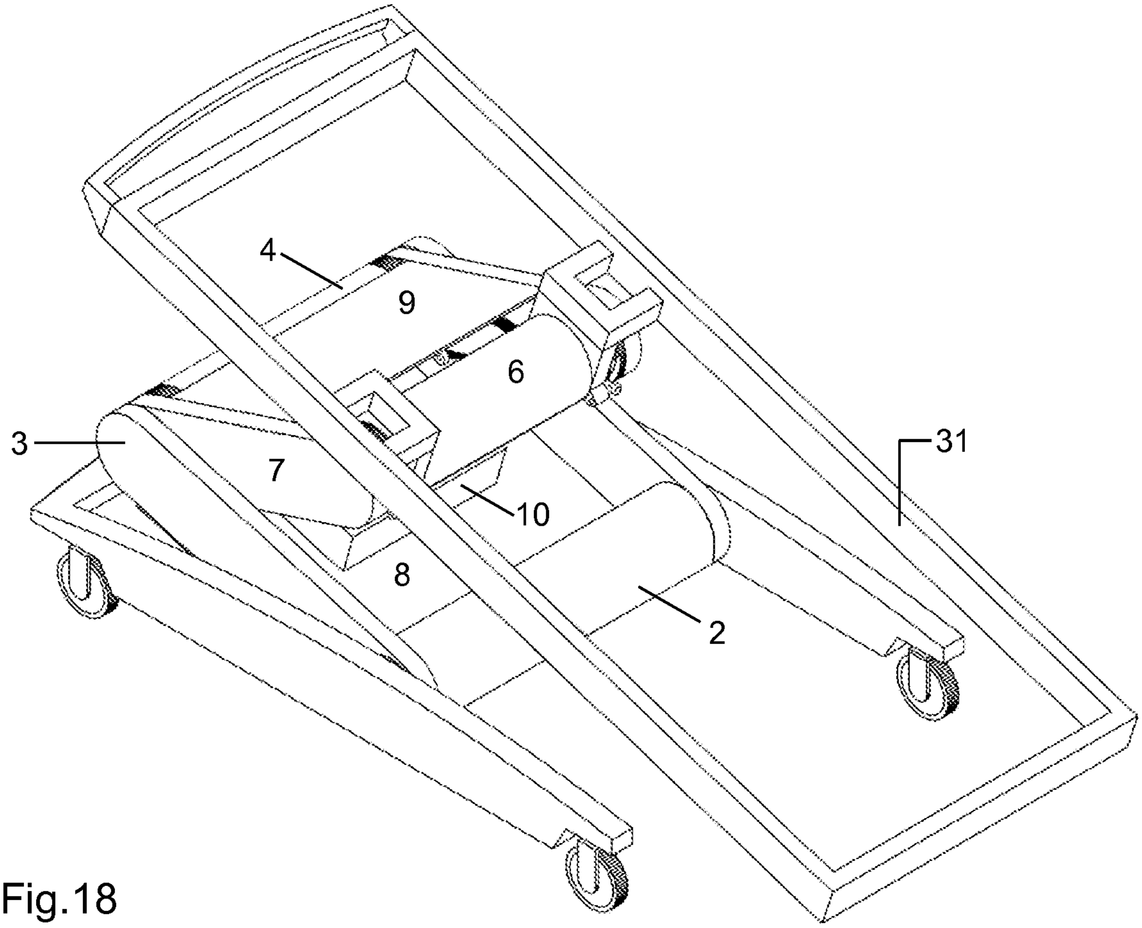
Figure 21:
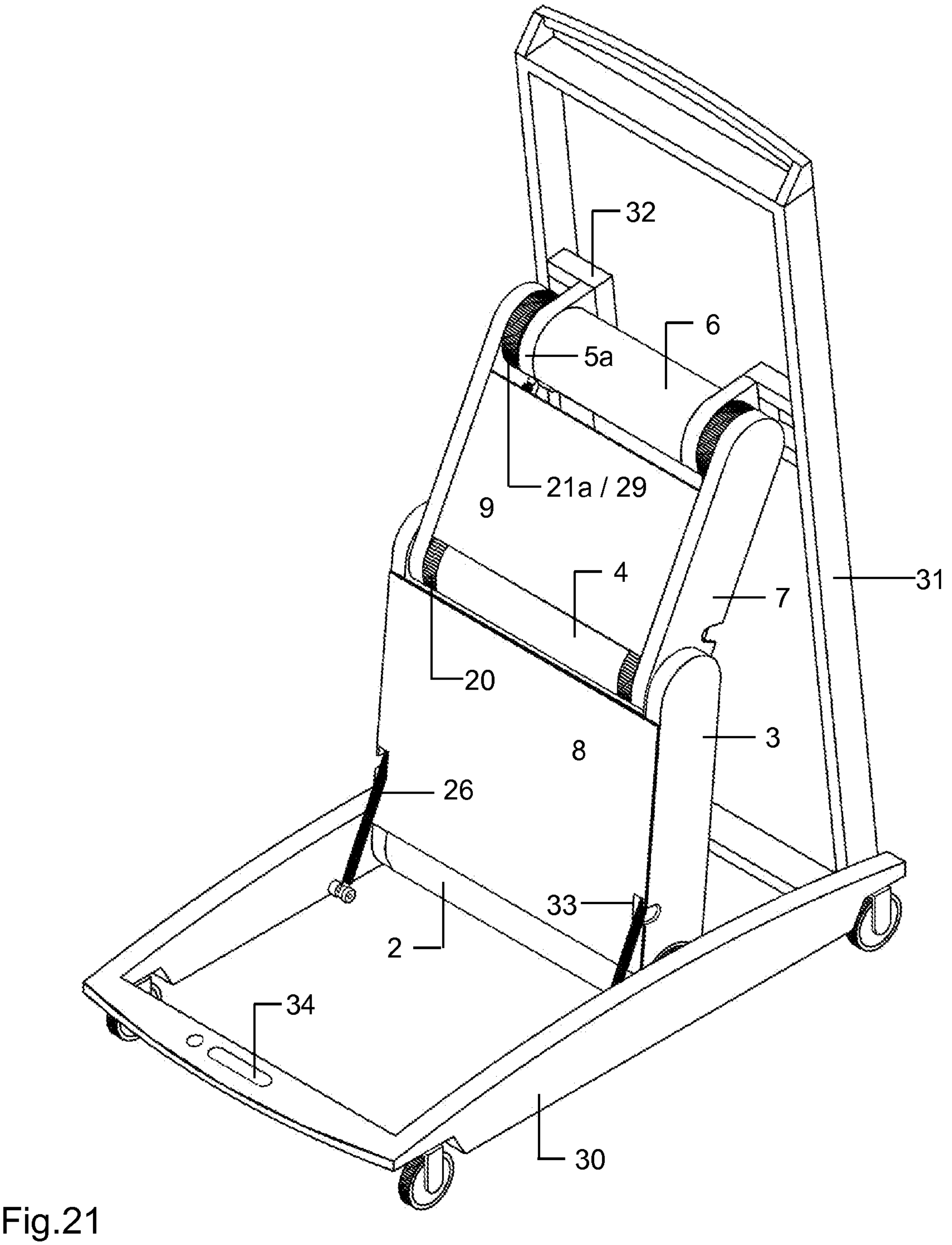

The Adjustment of the Sleeping Platform Structure to the so-Called Stand-Up Position of the Bed:

The adjustment of the sleeping platform structure of the bed (31) to the so-called stand-up position of the bed (FIG. 11*a*, FIG. 20 *ja* FIG. 21), is done in such a way, that by means of the adjustments of the rotation cylinders (2, 4) of the lower and middle structural parts (1*a*, 1*b*) of the adjustable pedestal structure of the bed of the invention and the lever arms (3, 7) connected thereto, the height position of the sleeping platform frame structure is further increased upward for example, from the so-called height position of nursing treatment, shown in the pictures FIG. 11*b*, FIG. 14*a* and FIG. 18, and at the same time by means of the adjustment movement of the rotation cylinder (6) of the upper structural part of the adjustable pedestal structure and the lever arms (5*a*) connected to it and attached to the sleeping platform structure the tilt angle of the counter-Trendelenburg position of the sleeping platform structure is increased. At the end of the adjustment movements described above, the sleeping platform frame structure is in the so-called stand-up position of the bed, where the user of the bed is standing on the bed end board (35) attached to the foot of the sleeping platform frame structure of the bed. The adjustment of the sleeping frame structure from its basic position shown in the pictures FIG. 11*c* and FIG. 15*b* or from any other tilt and height position of the sleeping platform frame structure to the so-called stand-up position of the bed and vice versa happens in a flexible and stepless way by means of the logic control of the functions of the adjusting actuators (15*a*, 15*b*) placed in the rotation cylinders (2, 4, 6) of the adjustable pedestal structure.

Extreme Positions of the Adjustments of the Sleeping Platform Structure of the Adjustable Pedestal Structure of the Bed of the Invention:

The adjustable pedestal structure solution of the bed of the invention enables in practice unlimited adjustments of the height and longitudinal tilt positions of the sleeping platform frame structure of the bed (31). Thanks to the adjustable pedestal structure solution of the bed of the invention, the sleeping platform structure of the bed can be adjusted from the so-called stand-up position of the sleeping platform frame structure further to horizontal position by means of the adjustment movement of the rotation cylinder (6) of the upper structural part (1*c*) of the adjustable pedestal structure and the lever arms (5*a*) connected thereto. (Compare with the pictures FIG. 11*a* and FIG. 12*a*)—or the sleeping platform frame structure of the bed can respectively steplessly be adjusted to different height and tilt positions between the maximum structural height described above and the lowest height position of the adjustable pedestal structure. The adjustable pedestal structure of the bed of the invention also structurally enables the tilt angle of the Trendelenburg position of the sleeping platform structure of the bed, which is a mirror image of the stand-up position of the bed. The user of the bed would in that case be completely in a head down position on the sleeping platform of the bed—Compare with the picture FIG. 11*a*. Naturally, the above-described extreme positions structurally enabled by the adjustable pedestal structure which are functionally far too large for the nursing treatment situations and situations when staying in bed, cannot be used in beds. However, they can be utilized in connection with other applications of the adjustable pedestal structure of the bed of the invention. The unlimited possibilities of the adjustments of the height and longitudinal tilt positions of the sleeping platform frame structure of the bed and their flexible variations explain the versatility and the functionally decisive difference and advantage of the entirely new type of adjustable pedestal structure of the invention over the support and adjustment mechanisms of the sleeping platform structures of the traditional beds. The different structural parts (1*a*, 1*b*, 1*c*) of the pedestal structure are connected to each other like a chain by means of the rotation cylinders (2, 4, 6) acting as adjustment mechanisms. This enables the extreme positions of the adjustable pedestal structure of the invention. In the structural solutions of the traditional adjustable beds based on the use of scissor lift mechanisms or on the use of lifting columns, the height and tilt angle adjustments of the sleeping platform structure are limited by the structural dimensions of their adjustment mechanisms.

The Gas Springs Assisting the Adjusting Actuators of the Structural Parts of the Adjustable Pedestal Structure of the Invention:

The sleeping platform structures supported by the adjustable pedestal structure of the bed of the invention and the structures which complement the other functional and ergonomic features of the sleeping platforms attached to them and the weight of the user of the bed form a heavy overall structure. The gas springs (26, 27, 28) connected to the lever arms (3, 7, 5*a*) of the structural parts of the pedestal structure significantly reduce the load on the structural members of the adjustable pedestal structure as well as on the rotation cylinder structures and the adjusting actuators and thus help to stabilize the adjustment movements of the pedestal structure. The placement of the gas springs in the structural parts of the adjustable pedestal structure of the bed of the invention is shown in the picture FIG. 10 and their trajectories in various adjustment positions of the sleeping platform frame structure in the pictures FIG. 11*a*-FIG. 11*c*, FIG. 12*a*-FIG. 12*c* and FIG. 13*a*-13*b*. The grooves (21*c*) in the mounting flanges (21*a*) of the axles (13*b*, 13*c*) placed in the rotation cylinders (4, 6) of the middle and upper structural parts (1*b*, 1*c*) of the adjustable pedestal structure allow the free movement of the gas springs as the pedestal structure adjusts to different positions, as well as their hidden placement. When the sleeping platform structure of the bed is in the so-called stand-up position the torque/force on the structural parts of the pedestal is highest. Gas springs (26) supported on the foot structure (30) of the adjustable pedestal structure and connected to the lever arms (3) of the lower structural part (1*a*) of the pedestal also serve as a mechanical safety system for the adjusting movement in question, as a stopper at the end of the extreme position. The adjustable pedestal structure of the bed of the invention may be implemented with or without the gas springs, because the power of the linear actuators alone is sufficient to move also the structurally heavy different types of sleeping platform structures during their adjustment. However, the connection of the gas springs to the structural parts of the adjustable pedestal structure is simple and inexpensive to implement. The utilization of them increases the lifespan of the adjusting actuators and the adjustment mechanism structures of the pedestal structure. The thrust of standard gas springs is high and completely sufficient for use in connection with the adjustment functions of the adjustable pedestal structure of the bed of the invention. By choosing the power of the gas springs, taking into account the weight of the various types of sleeping platform solutions supported by the sleeping platform structure of the bed and the safety coefficients of the weight of the user in bed, the adjustable pedestal structures can be implemented optimally so, that the power required for the linear actuators acting as the electrically operating adjustment mechanisms of the lever arms placed in the rotation cylinders, remains small.

5. Advantages of the Adjustable Pedestal Structure Solution of the Bed According to the Invention The starting point of the present invention has been to develop an adjustable pedestal structure of the bed with universal control features which at the same time complements the ergonomic and functional features of the invention PCT/FI2018/000007/"Adjustable bed solution". The inventions together form a completely new and universal adjustable bed solution for use by all target groups. The structural solution of the present invention the—Adjustable pedestal structure of the bed—allows the also in independent use operating seat module anchored to the sleeping platform structure of the bed of the invention the "Adjustable bed solution" to be placed in the pedestal structure of the bed. In traditional adjustable beds, there are solutions in which a wheelchair is attached to the sleeping platform structure of the bed, either through the end of the bed structure or from the side of it. However, due to the structural solutions of the pedestal structures of these beds, their adjustment properties are very limited. The adjustable pedestal structure of the bed of the invention can also as an independent solution be connected into the sleeping platform structure of almost any traditional bed solution to give them added value due to the versatility of the adjustments. See picture FIG. 15*a*. Requirements for the functional properties of the beds intended for use in nursing treatment, rehabilitation or home care vary widely from simple solutions to functionally demanding and highly sophisticated solutions. Due to the complete features of the adjustments and ergonomics and thus universal bed solutions enabled by the adjustable pedestal structure solution of the bed of the invention are able to serve their users in all situations, also in the changing circumstances of the future, as the moving ability of the user of the bed decreases over time. The adjustable pedestal structure of the bed of the invention enables the implementation of universal bed solutions with adjustment and ergonomic characteristics which have a decisive advantage and difference compared to traditional adjustable beds and the adjustment mechanisms used in them. The adjustable pedestal structure of the invention solves, for example, the significant functional deficiency of the traditional adjustable beds, implementation of the so-called stand-up bed function. The traditional so-called stand-up beds have specifically been designed for this function, which is why their other adjustment features are limited. Even in highly advanced hospital beds with otherwise versatile adjustments it has not been possible to implement the stand-up position of the sleeping platform structure of the bed due to their traditional adjustment mechanism solutions. The stand-up position of the bed is needed in situations where the user of the bed due to various reasons, an injury or for example, after surgery cannot bend his or her body when moving to or out of the bed. Adjustable beds implemented on the basis of the adjustable pedestal structure of the bed of the invention are suitable for use in all different locations of use from homes to hospitals. The adjustable pedestal structure supporting the sleeping platform structure of the bed allows all different adjustment movements of demanding care situations, the so-called position treatment and physiotherapy as well as the adjustment movements of the bed when staying in bed. The invention enables implementation of functionally and economically optimized bed solution for all different locations of use and for all different target groups of the beds. In addition to the functional properties of the beds, also the appearance of them is important considering the various locations of use of the beds, such as hospitals, rehabilitation centers and homes. The appearance of the adjustable pedestal structure of the bed of the invention is simple and furniture-like in nature. The adjusting actuators and their logic control unit, gas springs, electric wires and cables, and other electrical components are hidden inside the rotation cylinders and the lever arm structures of the pedestal structure or behind the connecting and cover plates attached to the lever arms. The plate surfaces of the pedestal structure are easy to keep clean even in the demanding use in hospital. Adjustable beds implemented on the basis of the invention can with good reason also be thought of as future beds with a modern appearance and as beds suitable for all different users in homes.

6. A DETAILED TECHNICAL DESCRIPTION THAT FOLLOWS THE REFERENCE NUMBERS USED IN THE DRAWINGS

FIG. 1*a*

The axonometric view shows the structural parts of the adjustable pedestal structure of the bed of the invention. The structural parts (1*a*, 1*b*, 1*c*) which enable the adjustments of the height and tilt positions of the pedestal structure are shown in their basic position. The sleeping platform frame structure (31) is then in a horizontal position and at its lowest elevation.

FIG. 1*b*

The axonometric view shows the structural parts (1*a*, 1*b*, 1*c*) of the adjustable pedestal structure of the bed of the invention, of which the lower (1*a*) and the middle (1*b*) structural part with a peripheral shape consist of the rotation cylinders (2, 4) and the lever arms (3, 7) fixedly connected to them, and the axles (13*b*, 13*c*) fixedly connected to the lever arms to opposite ends of the rotation cylinders. The upper structural part (1*c*) consists of the rotation cylinder (6) and the lever arms (5*a*) fixedly connected thereto. The fixed axle (13*a*) connected to the foot structure (30) of the pedestal structure is placed inside the rotation cylinder (2) of the lower structural part (1*a*). The rotation cylinders (2, 4, 6) of the structural parts of the adjustable pedestal structure and the lever arms (3, 7, 5*a*) connected thereto, are adjusted around the axle located inside the rotation cylinder of each structural part, the axles being connected to the ends of the lever arms of the structural parts, in the vertical order of the stand-up position of the sleeping platform structure, lower as the structural part in question or around the axle connected to the foot structure. The rotation cylinders act as electrically operated adjustment mechanisms for moving the lever arms of the structural parts of the adjustable pedestal structure. The connecting and rotation mechanism between the rotation cylinder (2, 4, 6) and the fixed axle (13*a*, 13*b*, 13*c*) located inside it, by means of which also the structural parts of the pedestal structure are connected to each other, is formed by the grooved ball bearings (21*b*) connected to the mounting flanges (18*a*, 21*a*) at the ends of the axle and the inner guide rings (19, 20) connected to the ends of the rotation cylinder and connected to the frame structures of the lever aims (22, 24). The rotation cylinders and axles of the structural parts of the adjustable pedestal structure are connected to each other as follows: The mounting flanges (18*a*) of the axle (13*a*) located inside the rotation cylinder (2) of the lower structural part (1*a*) are connected to the foot structure (30) of the pedestal structure. The axle structure is thus a structurally integral part of the foot structure. The mounting flanges (21*a*) of the axle (13*b*) located inside the rotation cylinder (4) of the middle structural part (1*b*) are connected to the end of the lever arms (3) of the lower structural part. The axle structure is thus a structurally integral part of the lower structural part (1*a*). The mounting flanges of the axle (13*c*) located inside the rotation cylinder (6) of the upper structural part (1*c*) (21*a*—the mounting flanges of the axles 13*b* and 13*c* are similar) are connected to the end of the lever arms (7) of the middle structural part (1*b*). The axle structure is thus a structurally integral part of the middle structural part (1*b*). The lever arms (5*a*) of the upper structural part (1*c*) are connected to the support profiles (32) of the sleeping platform frame structure of the bed. The lever arms (3 and 7) of the lower structural part (1*a*) and the middle structural part (1*b*) are connected to each other by means of connecting and cover plates (8 and 9) which provide lateral rigidity to the pedestal structure acting at the same time as cover plates of the structural parts. The logic control unit (10) of the adjusting actuators is placed in the lower structural part (1*a*) of the pedestal structure and attached to the inner surface of the connecting and cover plate (8) of the lever arms.

FIG. 2

The axonometric view shows the structure of the rotation cylinders (2, 4, 6) of the structural parts (1*a*, 1*b*, 1*c*) of the adjustable pedestal structure of the invention and the position of the lever aims (3, 7, 5*a*) connected to them when the pedestal structure is in its basic position as shown in the picture.

FIG. 3

The axonometric view shows the structure of the rotation cylinders of the structural parts (1*a*, 1*b*, 1*c*) of the adjustable pedestal structure of the invention and the position of the pair of lever arms connected to them when the sleeping platform frame structure (31) of the bed is in a horizontal position at the so-called height of nursing treatment.

FIG. 4

The axonometric view shows the structure of the rotation cylinders of the structural parts (1*a*, 1*b*, 1*c*) of the adjustable pedestal structure of the invention and the position of the pair of lever arms connected to them when the sleeping platform frame structure (31) of the bed is in the so-called stand-up position of the bed.

FIG. 5

The picture shows the structural section of the rotation cylinders (2, 4, 6) of the structural parts (1*a*, 1*b*, 1*c*) of the adjustable pedestal structure of the invention and the axles (13*a*, 13*b*, 13*c*) placed inside them at the point where the spindle (15*b*) of the linear actuator acting as the adjusting motor is located. The wide spiral flange (12*a*) is connected to the inner surface of the frame tube (11) of the rotation cylinder. The linear actuator (15*a*) is connected to the mounting flange (18*a*, 21*a*) of the axle. The adjustment movement of the linear actuator pushes and pulls the connecting module (14*a*) of the pushing wheels and the guide bearings of the spindle attached to the spindle of the linear actuator (15*b*) in the direction parallel to the axle inside the rotation cylinder, wherein the force forward and backward exerted on the spiral flange by the pushing wheels (17*a*) moving the wide spiral flange causes the rotational movement of the rotation cylinder clockwise or counterclockwise around the solid axle (13*a*, 13*b*, 13*c*) inside the cylinder connected to the foot structure (30) of the pedestal or to the lever arm (3, 7) of the lower or middle structural part of the pedestal structure. Connected to the opposite sides of the connecting module (14*a*) of the pushing wheels and the guide bearings of the spindle there are two pushing wheels (17*a*) between which the wide spiral flange (12*a*) connected to the inner surface of the frame tube (11) is located. The other of the pushing wheels (17*a*) pushes the wide spiral flange (12*a*) during the lifting adjustment movement of the lever arms (3, 7, 5*a*) connected to the rotation cylinder and the pushing wheel that is located on the opposite side of the connecting module supports the movement of the spiral flange during the downward adjustment movement of the lever arms or locks the adjustment movement of the lever arms to the desired height position of the sleeping platform frame structure of the bed. The lower surface of the axle (13*a*, 13*b*, 13*c*) has a guide groove (13*d*) for the connecting module (14*a*) of the pushing wheels and the guide bearings of the spindle connected to the spindle of the linear actuator. The guide bearings (16) are attached to the upper surface of the connecting module as shown in the picture. The guide bearings running along the guide groove maintain the position of the connecting module on the central axis of the rotation cylinder and prevent the connecting module from rotating and following the adjustment movement of the rotation cylinder. The spring-loaded ball head screws (14*b*) are connected to opposite side of the guide bearings (16) of the connecting module (14*a*) of the pushing wheels and the guide bearings of the spindle—at the lower surface in the picture—the one end of which rests against the frame tube (11) of the rotation cylinder and prevents the connecting module and the guide bearings (16) connected to it from falling out of the guide groove (13*d*) of the axle in the different adjustment positions of the lever arms of the adjustable pedestal structure.

FIG. 6

The picture shows the structural section of the rotation cylinders (2, 4, 6) of the structural parts (1*a*, 1*b*, 1*c*) of the adjustable pedestal structure of the invention and the axles (13*a*, 13*b*, 13*c*) placed inside them at the point where the motor housing of the linear actuator (15*a*) acting as the adjusting motor is located. In the background the picture shows the pushing wheels (17*a*) which move the wide spiral flange and the wide spiral flange (12*a*) located between them. The both pushing wheels are in constant contact with the spiral flange, the rotational movement of which occurs obliquely with respect to the central axis of the rotation cylinder, the picture shows the section of a spiral flange. See the pictures FIG. 8 and FIG. 9.

FIG. 7

The picture shows the structural section of the rotation cylinders (2, 4, 6) of the structural parts (1*a*, 1*b*, 1*c*) of the adjustable pedestal structure of the invention and the axles (13*a*, 13*b*, 13*c*) placed inside them at the point where the spindle of the linear actuator (15*b*) acting as the control motor is located. Two narrow spiral flanges (12*b*, 12*c*) are connected to the inner surface of the frame tube (11) of the rotation cylinder. The solution is an alternative application to the rotation cylinder structure shown in the pictures FIG. 5 and FIG. 6. The connecting module (14*a*) of the pushing wheels and the guide bearings of the spindle connected to the spindle of the linear actuator (15*b*) has three pushing wheels (17*b*) at an angle of 90 degrees to each other that move the narrow spiral flanges. The pushing wheels push or pull the narrow spiral flanges (12*b*, 12*c*) connected to the inner surface of the frame tube (11) of the rotation cylinder so, that one of the pushing wheels pushes the reinforced narrow spiral flange (12*b*) in the direction of the rotational motion of the lifting movement of the lever arms connected to the rotation cylinder and supports it when the lever arms are adjusted downwards and the two pushing wheels push or pull the narrow spiral flange (12*c*) between them on opposite side of the frame tube, wherein the contact of the pushing wheels with the spiral flanges is continuous as the spindle of the linear actuator moves forward and backward. The lower surface of the axles (13*a*, 13*b*, 13*c*) placed inside the rotation cylinders has a guide groove (13*d*) for the guide bearings of the spindle (16) of the adjusting actuator. The guide bearings are connected to connecting module (14*a*) of the pushing wheels and the guide bearings of the spindle. The symmetrical arrangement of the narrow spiral flanges (12*b*, 12*c*) and the pushing wheels (17*b*) connected to the connecting module (14*a*) and that move the narrow spiral flanges, as well as the guide bearings running along the guide groove (13*d*) maintain the same position of the connecting module on the central axis of the frame tube of the rotation cylinder when the spindle of the linear actuator moves, whereby the guide bearings of the spindle (16) connected to it also remain in their correct position (height position in the picture) in the guide groove under the axle.

FIG. 8

The picture shows the structure of the lower structural part (1*a*) of the adjustable pedestal structure of the invention: The rotation cylinder (2) and the lever arms (3) connected thereto, as well as the axle (13*b*) connected to the ends of the lever arms form a structure with a unitary peripheral shape which is adjusted around the fixed axle (13*a*) located inside the rotation cylinder. The lever arms are connected to each other by means of the connecting and cover plate (8) of the lever arms. The mounting flanges (18) of the axle (13*a*) located inside the rotation cylinder are fixedly connected to the foot structure (30) of the pedestal structure. The grooved ball bearings (21*b*) are connected to the mounting flanges (18) of the axle (13*a*) located inside the rotation cylinder. The inner guide rings (19) connected to the ends of the frame tube (11) of the rotation cylinder and connected to the frame structure (22) of the lever arms (3) act as counterparts to the grooved ball bearings. The grooved ball bearings and the inner guide rings form the rotation mechanism between the rotation cylinder and the lever arms connected thereto and the fixed axle structure located inside the rotation cylinder. The inner guide rings (19) are shown as independent parts for the sake of clarity in the picture. However, they are an integral part of the structure of the ends of the frame tube. A wide spiral flange (12*a*) is attached to the inner surface of the frame tube (11) of the rotation cylinder. The motor housing (15*a*) of the linear actuator acting as the motor of the adjustment movement of the rotation cylinder is connected to the mounting flange (18) of the axle (13*a*) located inside the rotation cylinder. The spindle (15*b*) of the linear actuator is connected to the connecting module (14*a*) of the pushing wheels and the guide bearings of the spindle. The pushing wheels (17*a*) that move the wide spiral flange, as well as the guide bearings of the spindle (16) and the spring-loaded ball head screws (14*b*) are connected to the connecting module. The lower surface of the axle has a guide groove (13*d*) for the guide bearings of the spindle (16) of the linear actuator Similar grooved ball bearings (21*b*) as to the mounting flanges (18) of the axle (13*a*) located inside the rotation cylinder (2) are attached to the mounting flanges (21*a*) of the axle (13*b*) connected to the ends of the lever arms (3) of the lower structural part of the pedestal structure. The mounting flanges have a groove (21*c*) in their structure for the unobstructed movements of the gas springs (28).

FIG. 9

The picture shows the structure of the middle structural part (1*b*) of the adjustable pedestal structure of the invention: The rotation cylinder (4) and the lever arms (7) connected thereto, as well as the axle (13*c*) connected to the ends of the lever arms form a structure with a unitary peripheral shape which is adjusted around the fixed axle (13*b*) located inside the rotation cylinder. The mounting flanges (21*a*) at the ends of the axle structure located inside the rotation cylinder are connected to the ends of the lever aims (3) of the lower structural part (1*a*). The lever arms are connected to each other by means of the connecting and cover plate (9), see picture FIG. 1*b*. The grooved ball bearings (21*b*) are connected to the mounting flanges (21*a*) of the axle (13*b*) located inside the rotation cylinder. The mounting flanges have a groove (21*c*) in their structure for the unobstructed movements of the gas springs (27). The inner guide rings (20) connected to the ends of the frame tube (11) of the rotation cylinder and connected to the frame structure (24) of the lever arms (7) act as counterparts to the grooved ball bearings. The grooved ball bearings and the inner guide rings form the rotation mechanism between the rotation cylinder (4) and the lever arms connected thereto and the fixed axle structure located inside the rotation cylinder. The adjustment mechanism structure that moves the lever arms (7) of the middle structural part (1*b*) located inside the rotation cylinder (4) is similar to that of the lower structural part (1*a*) of the pedestal structure described above: The wide spiral flange (12*a*) is connected to the inner surface of the frame tube (11) of the rotation cylinder. The motor housing (15*a*) of the linear actuator acting as the motor of the adjustment movement of the rotation cylinder is connected to the mounting flange (21*a*) of the axle (13*b*). The spindle (15*b*) of the linear actuator is connected to the connecting module (14*a*) of the pushing wheels and the guide bearings of the spindle. The pushing wheels (17*a*) that move the wide spiral flange, as well as the guide bearings of the spindle (16) of the linear actuator and the spring-loaded ball head screws (14*b*) are connected to the connecting module. The lower surface of the axle has a guide groove (13*d*) for the guide bearings of the spindle (16) of the linear actuator. Similar grooved ball bearings (21*b*) as to the mounting flanges (21*a*) of the axle (13*b*) located inside the rotation cylinder (4) are connected to the mounting flanges (21*a*) of the axle (13*c*) connected to the ends of the lever arms (7) of the middle structural part of the pedestal structure. The mounting flanges have a groove (21*c*) in their structure for the unobstructed movements of the gas springs (28). The structure of the upper structural part (1*c*) of the pedestal structure shown in the picture is explained in connection with the following picture FIG. 10.

FIG. 10

The picture shows the structure of the upper structural part (1*c*) of the adjustable pedestal structure of the invention and the connection of the gas springs (26, 27, 28) connected to the structural parts of the pedestal structure to the lever arm structures (3, 7, 5*a*) of the structural parts (1*a*, 1*b*, 1*c*). The rotation cylinder (6) of the upper structural part (1*c*) and the lever arms (5*a*) connected thereto form a structure with a unitary U-shape which is adjusted around the solid axle (13*c*) at the ends of the lever arms (7) of the middle structural part (1*b*) of the pedestal structure located inside the rotation cylinder. The grooved ball bearings (21*b*) are connected to the mounting flanges (21*a*) of the axle (13*c*) located inside the rotation cylinder. The inner guide rings (5*b*) connected to the lever arms (5*a*) and to the ends of the frame tube (11) of the rotation cylinder act as counterparts to them, as well as in the lower and middle structural part of the adjustable pedestal structure. The grooved ball bearings and the inner guide rings form the rotation mechanism between the rotation cylinder and the lever arms (5*a*) connected thereto and the fixed axle structure located inside the rotation cylinder. The cover rings (29) are placed around the mounting flanges of the axle. The connecting fittings (5*c*)

of the gas springs (28) are connected on the lever arms. The mounting flanges have a groove (21*c*) in their structure for the unobstructed movements of the gas springs (28). The adjustment mechanism structure that moves the lever arms (5*a*) of the upper structural part (1*c*) located inside the rotation cylinder (6) is similar to those of the lower structural part (1*a*) and the middle structural part (1*b*) of the pedestal structure described above: The wide spiral flange (12*a*) or the narrow spiral flanges (12*b*, 12*c*) are connected to the inner surface of the frame tube (11) of the rotation cylinder. The motor housing (15*a*) of the linear actuator acting as the motor of the adjustment movement of the rotation cylinder is connected to the mounting flange (21*a*) of the axle (13*c*). The spindle (15*b*) of the linear actuator is connected to the connecting module (14*a*) of the pushing wheels and the guide bearings of the spindle. The pushing wheels (17*a*) that move the wide spiral flange or the pushing wheels (17*b*) that move the narrow spiral flanges as well as the guide bearings of the spindle (16) of the linear actuator and the spring-loaded ball head screws (14*b*) are connected to the connecting module. The lower surface of the axle has a guide groove (13*d*) for the guide bearings of the spindle (16) of the linear actuator. The adjustment mechanism structures that move the lever arms (3, 7, 5*a*) of the different structural parts differ from each other only with respect to the different stroke lengths of the linear actuators used in them and the different lengths and densities of the threads of the wide spiral flange (12*a*) or the narrow spiral flanges (12*b*, 12*c*). The lever arms (5*a*) connected to the rotation cylinder (6) are connected to the support profiles (32) of the sleeping platform frame structure (31) of the bed or respectively to the frame structures of different types of sleeping platform frame structures. The Trendelenburg and counter-Trendelenburg tilt angle positions of the sleeping platform of the bed are adjusted by means of the adjustment movement of the lever arms. The placement of the gas springs in the lever arm structures of the adjustable pedestal structure is implemented as follows: The cylinders of the gas springs (26) that move the lever arms (3) of the lower structural part (1*a*) of the adjustable pedestal structure are attached to the foot structure (30) of the pedestal structure and the pistons of the gas springs to the frame structures (22) of the lever arms (3) in question. See pictures FIG. 11*a* FIG. 11*c*. The cylinders of the gas springs (27) that move the lever arms (7) of the middle structural part of the adjustable pedestal structure are connected to the to the frame structures (22) of the lever arms (3) of the lower structural part and the pistons of the gas springs to the frame structures (24) of the lever arms of the structural part in question. The lever arms (3 and 7) of the lower (1*a*) and middle (1*b*) structural parts of the adjustable pedestal structure are housing-like structures inside which the gas springs (26 and 27) are located. The gas springs remain hidden behind the cover plates (23, 25) of the lever arm frame structures (22, 24). The gas springs (28) that move the lever arms (5*a*) of the upper structural part of the adjustable pedestal structure remain hidden behind the connecting and cover plate (9) of the lever aims of the middle structural part. The cylinders of the gas springs are attached to the sides inside the middle structural part (1*b*) of the frame structures (24) of the lever arms (7) of the middle structural part and the pistons of the gas springs are attached to the connecting fittings (5*c*) of the gas springs attached to the lever arms (5*a*) of the upper structural part. See pictures FIG. 12*a*-FIG. 12*c*. The grooves (21*c*) in the structure of the mounting flanges of the axles (13*b*, 13*c*) of the middle (1*b*) and upper structural part (1*c*) of the adjustable pedestal structure and the openings in the lower surfaces (33) of the frame structures (22, 24) of the lever arms (3, 7) of the lower (1*a*) and middle structural part (1*b*) of the pedestal structure enable unobstructed trajectories of the gas springs (26, 27, 28) when the lever arms of the structural parts of the pedestal structure are adjusted from the lowest height position of the sleeping platform frame structure to the so-called stand-up position of the bed. See also the picture FIG. 20. The placement of the gas springs hidden inside the structural parts of the pedestal structure affects the appearance of the bed structure itself. However, the most important factors are the easiness of cleaning the pedestal structure, for example in hospital facilities where hygiene is required and the safety of use of the pedestal structure during the adjustments. The protection of the visible gas springs would be difficult to implement.

Figure 11C:
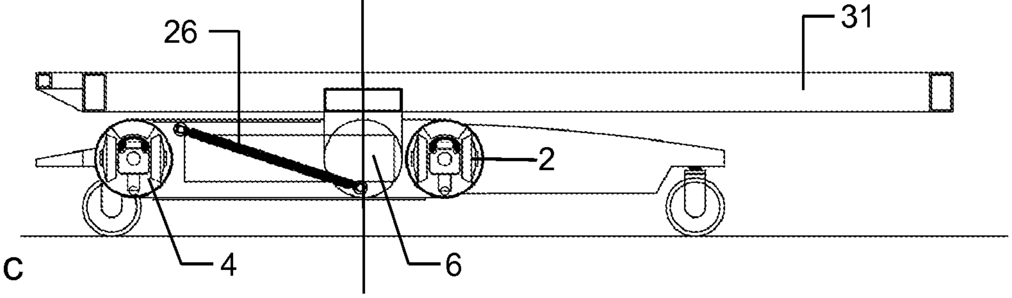

FIG. 11*a*-FIG. 11*c*

The pictures show the placement and trajectories of the gas springs (26) attached to the lower structural part (1*a*) of the adjustable pedestal structure of the bed of the invention in different adjustment positions of the pedestal structure. In the picture FIG. 11*a* the adjustable pedestal structure is in the so-called stand-up position of the bed where the user of the bed is standing on the bed end board (35) connected to the sleeping platform frame structure of the bed. In the picture FIG. 11*b*, the sleeping platform frame structure (31) of the bed is at the so-called height of nursing treatment in a horizontal position. In the picture FIG. 11*c* the sleeping platform frame structure of the bed is at its lowest height position in a horizontal position. When the adjustment occurs from the lowest height position of the sleeping platform frame structure of the bed (FIG. 11*c* and FIG. 15*b*) to the so-called height of nursing treatment (FIG. 11*b* and FIG. 16) the sleeping platform frame structure moves perpendicularly upward along the rising axis (36) of the structural parts of the pedestal structure shown in the pictures.

Figure 12A:
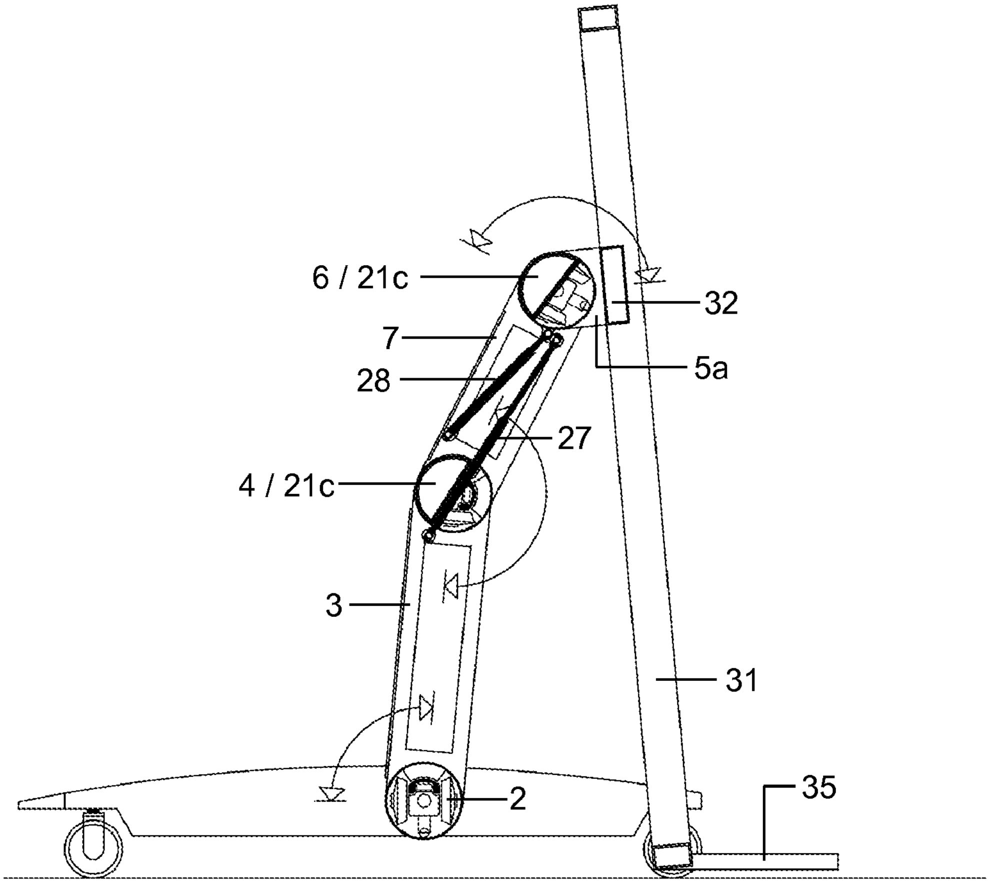
Figure 12B:
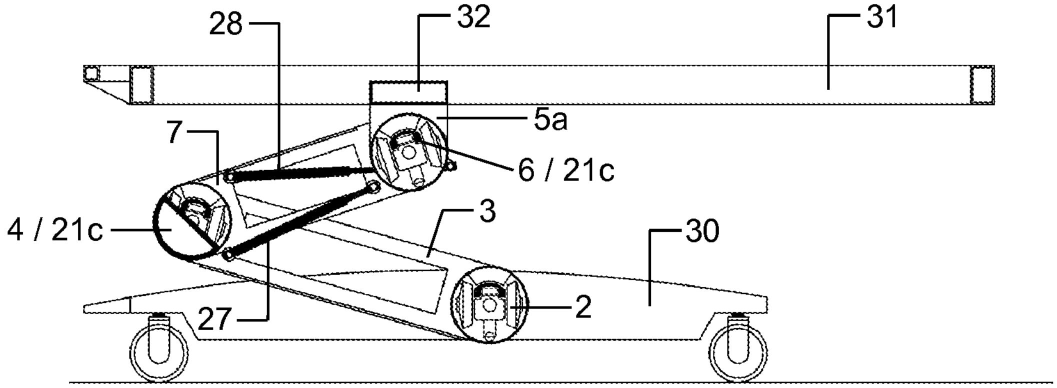
Figure 12C:
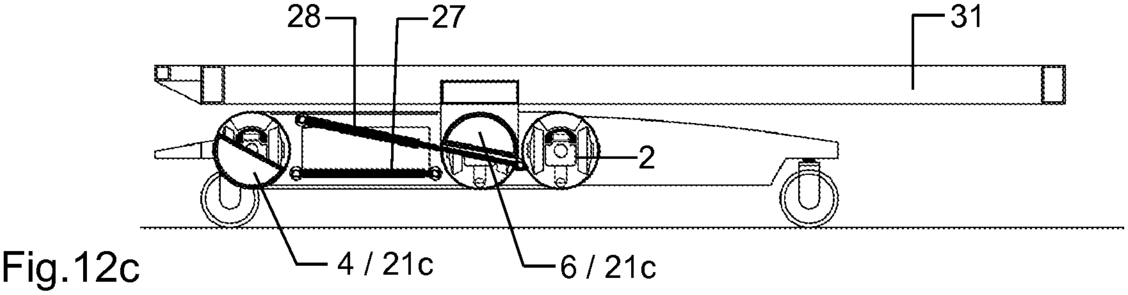

FIG. 12*a*-FIG. 12*c*

The pictures show the placement and trajectories of the gas springs (27, 28) attached to the middle structural part (1*b*) and the upper structural part (1*c*) of the pedestal structure in different adjustment positions of the pedestal structure. In the picture FIG. 12*a* the adjustable pedestal structure is in the so-called stand-up bed position. The cylinders of the gas springs (27) that move the middle structural part of the pedestal structure (1*b*) are located in the grooves (21*c*) of the mounting flanges of the axle (13*b*) placed inside the rotation cylinder (4). In the picture FIG. 12*b* the sleeping platform frame structure (31) of the bed is at the height of nursing treatments in a horizontal position. The pistons of the gas springs (28) that move the upper structural part (1*c*) of the pedestal structure are located in the grooves (21*c*) of the mounting flanges of the axle (13*c*) placed inside the rotation cylinder (6). In the picture FIG. 12*c*, the sleeping platform frame structure is at its lowest height position in a horizontal position. The pistons of the gas springs (28) that move the upper structural part (1*c*) of the pedestal structure are located in the grooves (21*c*) of the mounting flanges of the axle (13*c*) located inside the rotation cylinder (6). The grooves (21*c*) in the mounting flanges (21*a*) of the axles (13*b*, 13*c*) of the middle and upper structural parts of the pedestal structure allow the free adjustment movement of the gas springs in all adjustment positions of the pedestal structure.

FIG. 13*a*-FIG. 13*b*

The pictures show the positions of the gas springs (28) attached to the upper structural part (1*c*) of the adjustable pedestal structure of the bed of the invention and the positions of the grooves (21*c*) in the mounting flanges of the axle (13*c*) connected to the end of the lever arms (7) of the middle structural part located inside the rotation cylinder (6) of the upper structural part in different adjustment positions of the pedestal structure. In the picture FIG. 13*a* the adjustable pedestal structure and the sleeping platform frame structure (31) of the pedestal connected to the lever aims (5*a*) of the upper structural part are in the so-called stand-up position of the bed. In this position the pistons of the gas springs (28) are not located in the grooves (21*c*) of the mounting flanges (21*a*). As the structural parts of the pedestal structure and the sleeping platform frame structure of the bed are adjusted toward the lowest height position of the sleeping platform frame structure of the bed as shown in the picture FIG. 13*b*, the sleeping platform frame structure of the bed is adjusted around the axle (13*c*) located inside the rotation cylinder during the adjustment movement of the rotation cylinder (6), in the picture counter-clockwise. Compare with the pictures FIG. 11*a*-FIG. 11*c*. The linear actuator located in the rotation cylinder is assisted by the gas springs, the cylinders of which are attached to the lever arms (7) of the middle structural part of the pedestal structure and the pistons to the connecting fittings (5*c*) of the gas springs connected to the lever arms (5*a*) of the upper structural part. The gas springs push the rotation cylinder and the lever arms (5*a*) connected thereto and the sleeping platform frame structure (31) of the bed connected to the lever arms in the direction of rotation of the adjustment movement of the linear actuator. As the sleeping platform structure of the bed adjusts to its lowest height position shown in the picture FIG. 13*b*, the pistons of the gas springs have slid inside the grooves (21*c*) of the mounting flanges of the axle (13*c*) located inside the rotation cylinder (6) of the upper structural part of the pedestal structure.

FIG. 14*a*-FIG. 14*c*

The pictures show the positions of the lower (1*a*), middle (1*b*) and upper (1*c*) structural parts of the adjustable pedestal structure of the bed of the invention when the sleeping platform frame structure of the bed (31) is at the so-called height of nursing treatment and in its lowest height position as well as the tilt angle positions of the sleeping platform frame structure of the bed in the Trendelenburg and counter-Trendelenburg position. The adjustments of the Trendelenburg and counter-Trendelenburg positions of the sleeping platform frame structure of the bed are made by means of the height adjustments of the lower (1*a*) and middle structural part (1*b*) of the adjustable pedestal structure in such a way, that the height position of the sleeping platform frame structure is adjusted in accordance with the purpose and at the same time or at the end of the adjustment movement in question or before it the tilt angle position of the sleeping platform frame structure is adjusted to the tilt angle of the Trendelenburg or counter-Trendelenburg position required for each situation of use of the bed by means of the adjustment movement of the lever arms (5*a*) of the upper structural part (1*c*) of the pedestal structure. The tilt angle position of the sleeping platform frame structure is in the picture FIG. 14*c* close to the maximum tilt angle of the Trendelenburg position—about 20 degrees—allowed by the traditional adjustment mechanisms of the beds, see FIG. 22 and in the picture FIG. 14*a* in the adjustment position near the maximum tilt angle of the counter-Trendelenburg position allowed by them—about 20 degrees, see picture FIG. 23. Due to the adjustable pedestal structure solution of the invention, the tilt angle of the Trendelenburg position of the sleeping platform frame structure can further be increased from the adjustment positions shown in the pictures FIG. 14*b* and FIG. 14*c*, by means of the independent adjusting movement of the lever arms (7) of the middle structural part (1*b*) of the pedestal structure, up to the selected largest tilt angle of the Trendelenburg position of the bed, counter-clockwise in the pictures. The structural solution of the adjustable pedestal structure of the invention enables the adjustments of the Trendelenburg positions of the sleeping platform frame structure of the bed in all different height positions of the structural parts of the pedestal structure. The adjustment of the sleeping platform frame structure of the bed from its lowest height position shown in the pictures FIG. 11*c* and FIG. 12*c* to the counter-Trendelenburg position requires the lower (1*a*) and middle structural part (1*b*) of the pedestal structure to be adjusted slightly higher in the height direction, whereby at the same time the adjustment movement of the tilt angle of the sleeping platform frame structure to the counter-Trendelenburg position may begin. In the picture FIG. 14*c* the adjustable pedestal structure of the bed of the invention is at its lowest height position and in the picture FIG. 14*b* at the so-called height position of nursing treatment in the Trendelenburg position of the sleeping platform frame structure of the bed (31). In the picture FIG. 14*a* the sleeping platform frame structure of the bed is at the so-called height position of nursing treatment in the counter-Trendelenburg position from which the tilt angle adjustment movement of the sleeping platform frame structure still can be continued by the adjustments of the structural parts of the adjustable pedestal structure to the stand-up position of the bed, which at the same time is the largest counter-Trendelenburg position of the bed.

FIG. 15*a*

The axonometric picture shows the foot structure (30) equipped with wheels of the adjustable pedestal structure of the bed of the invention and the structural parts (1*a*, 1*b* 1*c*) of the pedestal structure supported by it in their basic position according to the picture FIG. 2. The sleeping platform structure of almost any traditional structurally fixed or adjustable bed solution can be connected to the lever arms (5*a*) of the upper structural part (1*c*) of the adjustable pedestal structure of the bed of the invention to replace the traditional support and adjustment mechanisms of the sleeping platform structures used in them. The picture also shows the placement of the lifting wheels (43) of the lateral tilt angle adjustment of the bed structure that are connected to the horizontal profiles of the foot structure (30) of the pedestal structure. The lifting wheels on the other side of the bed are adjusted downwards to the lifting position by means of motors and after that the side in question of the bed structure rises upwards and the bed structure tilts sideways. The tilting function of the bed structure is used during treatment procedures or, for example, to facilitate the work of the caregiver when he or she changes the position of the person lying in bed.

FIG. 15*b*

The picture shows the adjustable pedestal structure of the bed of the invention in its basic position with the sleeping platform frame structure (31) of the bed in a horizontal position at its lowest height position. The foot structure (30) of the adjustable pedestal structure supports the structural parts (1*a*, 1*b*, 1*c*) which act as the adjustment mechanisms of the pedestal structure located under the sleeping platform frame structure. The sleeping platform frame structure is connected to the lever arms (5*a*) of the upper structural part (1*c*) of the adjustable pedestal structure by means of the support profiles (32) of the sleeping platform frame structure.

FIG. 16

The picture shows the adjustable pedestal structure of the bed of the invention when the sleeping platform frame structure (31) is in a horizontal position at the so-called height of nursing treatment.

FIG. 17

The picture shows the adjustable pedestal structure of the bed when the sleeping platform frame structure is in the Trendelenburg position and at the so-called height of nursing treatment. In the Trendelenburg nursing position the bed user is with the head down in the bed. The adjustment of the sleeping platform frame structure to the Trendelenburg position from the horizontal position shown in the picture FIG. 15*b* takes place by means of the adjustment movement of the rotation cylinder (6) of the upper structural part (1*c*) of the adjustment mechanism and the lever arms (5*a*) connected thereto. In the Trendelenburg and counter-Trendelenburg positions the tilt angle and the height position of the sleeping platform structure can steplessly be adjusted to suit the requirements of the different treatment situations.

FIG. 18

The picture shows the adjustable pedestal structure of the bed of the invention when the sleeping platform frame structure (31) is in the counter-Trendelenburg position at the so-called height of nursing treatment. In the counter-Trendelenburg position of the sleeping platform frame structure of the bed the user of the bed is with the head up in the bed. By continuing the adjustment further the bed structure is transformed into the so-called stand-up bed position.

FIG. 19

The picture shows the adjustable pedestal structure of the bed and the sleeping platform frame structure (31) seen from behind in the positions described above. The display panel of the adjustment functions of the bed and the electrical connection to the bed structure (34) are located in the foot structure (30) of the pedestal structure.

FIG. 20

The picture shows the adjustable pedestal structure of the bed and the sleeping platform frame structure connected to it in the so-called stand-up position of the bed where the user of the bed is standing on the bed end board (35) connected to the foot end of the sleeping platform frame structure of the bed (31). In the picture the bed end board is shown for reference. The larger width, as the width of the sleeping platform frame structure of the bed, of the foot structure (30) equipped with wheels of the adjustable pedestal structure and its U-shaped structure open at the foot end of the bed enable the so-called stand-up position of the bed and the placement of the above-mentioned seat module equipped with wheels which is anchored at the foot end of the sleeping platform frame structure of the bed in the various adjustment positions of the adjustable bed structure presented in the invention PCT/FI2018/000007/"Adjustable bed solution".

FIG. 21

The picture shows the adjustable pedestal structure of the bed of the invention and the sleeping platform frame structure connected thereto in the stand-up position of the bed seen from behind. The gas springs (26) attached to the lower part of the adjustable pedestal structure are visible only in the stand-up position of the bed.

FIG. 22

The picture shows a typical adjustable bed used in hospital wards and various care and rehabilitation centers. The scissor lift mechanism structure to which the actuators are connected acts as the height adjustment and tilt angle adjustment mechanism of the sleeping platform structure. The bed is adjusted to the Trendelenburg position of the sleeping platform structure at the height of nursing treatment.

FIG. 23

The picture shows the sleeping platform of the adjustable bed of the previous picture in the counter-Trendelenburg position. The 4-part bed section placed on top of the sleeping platform frame structure of the bed has been adjusted to a semi-sitting care position and/or to a position in which to stay in bed.

FIG. 24

The picture shows a typical adjustable bed used in hospital wards and various care institutions. The lifting columns placed on the foot structure equipped with wheels act as the height and tilt angle adjustment mechanisms of the sleeping platform structure of the bed. The sleeping platform frame structure of the bed supports the 4-part bed section, the tilt angle adjustments of the back, pelvis, knee and the foot section plates of which are performed either mechanically or electrically.

FIG. 25

The picture shows a typical so-called stand-up bed. The scissor lift mechanism structure to which the actuators are connected act as the height adjustment mechanism of the sleeping platform structure and the tilt angle adjustment mechanism of the stand-up position of the bed. Stand-up beds are used in hospitals and various care institutions in the so-called position treatments. With the help of the stand-up bed function, the user of the bed, who is not able to bend his or her body, can move to and out of the bed independently as well. In some stand-up bed solutions the sleeping platform structure transforms into a seat at the foot end of the bed, which allows the user to move into the bed also through the sitting position. The adjustment mechanism solutions developed for the implementation of the stand-up position of the bed substantially limit the other adjustment possibilities of their sleeping platform structures.

FIG. 26

The picture shows the connection of the seat module equipped with wheels anchored at the foot end of the sleeping platform structure of the bed included in the bed solution of the previously mentioned invention PCT/FI2018/000007 "Adjustable bed solution". In the picture the adjustable sleeping platform structure is supported by the adjustable pedestal structure of the bed of the present invention.

FIG. 27

The picture shows the seat module anchored to the sleeping platform frame structure of the bed.

FIG. 28

The picture shows an industrial robot, the robot arm structure of which illustrates the operating principle of the structural parts of the adjustable pedestal structure of the bed of the invention. Computer-controlled robots act as general-purpose machines for handling structural parts or tools. The movements of the robots can be implemented by means of electric, pneumatic or hydraulic motors. Their higher load control motors, which operate on 230V mains voltage, are not suitable for the implementation of a bed furniture adjustment mechanism solution such as the invention.

FIG. 29

The picture shows a small industrial robot. Industrial robots used for precision work with low loads use low-voltage electric motors placed in the joints of robotic arms.

FIG. 30

The picture shows the structure of a low-voltage 12/24V lightweight tubular motor used for example in sunblind roller curtains. The movement of the rotating axle of the electric motor (38*a*), which has been connected to the mounting flange of the tubular motor, is transmitted via the brake (38*b*), gear (38*c*) and drive wheel (38*d*) of the mechanism to the rotating frame tube (37) with bearings at the ends and causes the rotational adjustment movement of the tubular motor.

FIG. 31

The picture shows a roller lift door solution adjusted by a low voltage tubular motor (39). The rotational adjustment movement of the axle of the motor is transmitted to the rotation cylinder of the roller lift door (41) by means of the transmission chain mechanism (40) connected to the mounting plate (42) of the door mechanism. With the help of the rotation cylinder solution of the adjustable pedestal structure of the invention, the adjustment movement of the roller lift door in the picture can be implemented with a simpler structural solution: Instead of the rotation cylinder (41) of the roller lift door mechanism in the picture, the application of the rotation cylinder solution of the invention is supported on the side walls of the door opening. By increasing the stroke of the linear actuator acting as the adjustment motor and the length and density of the threads of the wide spiral flange (12*a*) or the narrow spiral flanges (12*b*, 12*c*) connected on the inner surface of frame tube (11) of the rotation cylinder, the required number of rotations of the rotation cylinder for the open-closed positions of the roller lift door is achieved.

7. POSSIBLE MODIFICATIONS AND ALTERNATIVE APPLICATIONS ACCORDING TO THE INVENTION

The adjustable pedestal structure of the bed of the invention can be connected to the sleeping platform structure of almost any traditional adjustable bed to replace the traditional height and tilt angle position adjustment mechanisms of the sleeping platform used in them or the adjustable pedestal structure can be connected to the sleeping platform structure of the bed resting on its feet used in homes and converted it into an adjustable bed. The rotation cylinder solution of the invention offers new possibilities for the applications and use of control mechanisms of various machines and devices previously operated with a supply voltage of 230V mains, etc. in places where the control motors must operate at low-voltage. The adjustable pedestal structure of the bed of the invention can be connected to different kind of worktops and tables and convert them into adjustable furniture or it can be utilized in different lifting levels and the like. The rotation cylinder solution of the adjustable pedestal structure of the bed of the invention is a new type of low-voltage adjustment mechanism solution comparable to tubular motors, which is capable of handling significantly higher loads than the traditional tubular motors operating at low-voltage.

REFERENCE NUMBERS

1*a* Lower structural part of the adjustable pedestal structure

1*b* Middle structural part of the adjustable pedestal structure

1*c* Upper structural part of the adjustable pedestal structure

2 Rotation cylinder of the lower structural part (1*a*)

3 Lever arm of the lower structural part (1*a*)

4 Rotation cylinder of the middle structural part (1*b*)

5*a* Lever arm of the upper structural part (1*c*)

5*b* Inner guide ring connected to the lever arm (5*a*) of the upper structural part

5*c* Connecting fitting of the gas spring (28) connected to the lever arm (5*a*) of the upper structural part

5*d* Connecting fittings of the gas springs (26,27) to the lever arms (3,7)

6 Rotation cylinder of the upper structural part

7 Lever arm of the middle structural part (1*b*)

8 Connecting and cover plate of the lever arms (3) of the lower structural part (1*a*)

9 Connecting and cover plate of the lever arms (7) of the middle structural part (1*b*)

10 Logic control unit of the actuators

11 Frame tube of the rotation cylinder

12*a* Wide spiral flange attached to the inner surface of the frame tube (11) of the rotation cylinder

12*b* Reinforced narrow spiral flange

12*c* Narrow spiral flange between the pushing wheels

13*a* Axle connected to the foot structure of the pedestal (30)

13*b* Axle connected to the ends of the lever arms (3) of the lower structural part (1*a*)

13*c* Axle connected to the ends of the lever arms (7) of the middle structural part (1*b*)

13*d* Guide groove on the lower surface of the axle (13*a*,13*b*,13*d*) for the guide and support bearings (16) of the spindle (15*b*) of the actuator

14*a* Connecting module of the pushing wheels (17*a*,17*b*) and the guide bearings of the spindle (16) of the actuator

14*b* Spring-loaded ball head screw

15*a* Motor housing of the linear actuator

15*b* Spindle of the linear actuator

16 Guide bearings of the spindle (15*b*) of the linear actuator

17*a* Pushing wheel that moves the wide spiral flange

17*b* Pushing wheel that moves the narrow spiral flange

18 Mounting flange of the axle (13*a*) connected to the foot structure of the pedestal

19 Inner guide ring connected to the end of the frame tube (11) of the rotation cylinder (2) of the lower structural part (1*a*) and attached to the frame structure (22) of the lever aim (3)

20 Inner guide ring connected to the end of the frame tube (11) of the rotation cylinder (4) of the middle structural part (1*b*) and attached to the frame structure (24) of the lever arm (7)

21*a* Mounting flange of the axle (13*b*) of the lower structural part (1*a*) connected to the lever arm (3) and the mounting flange of the axle (13*c*) of the middle structural part (1*b*) connected to the lever arm (7)

21*b* The grooved ball bearings attached to the mounting flange of the axle (13*a*,13*b*,13*c*)

21*c* Groove (21*c*) in the mounting flange (21*a*) of the axle (13*b*) of the lower structural part (1*a*) and the axle (13*c*) of the middle structural part (1*b*) for movements of the gas spring

22 Frame structure of the lever arm (3) of the lower structural part (1*a*)

23 Cover plate of the frame structure of the lever arm (22) of the lower structural part

24 Frame structure of the lever arm (7) of the middle structural part (1*b*)

25 Cover plate of the frame structure of the lever arm (24) of the middle structural part

26 Gas spring that moves the lower structural part (1*a*) of the pedestal

27 Gas spring that moves the middle structural part (1*b*) of the pedestal
28 Gas spring that moves the lever arm (5*a*) of the upper structural part (1*c*) of the pedestal
29 Cover ring of the mounting flange (21*a*) of the axle (13*c*) of the middle structural part
30 Foot structure of the pedestal
31 Sleeping platform frame structure of the bed
32 Support profiles of the sleeping platform frame structure of the bed
33 Opening in the lower surface of the frame structure (22, 24) of the lever arm (3, 7) of the lower and the middle structural part (1*a*, 1*b*)
34 Display panel and electrical connection to the bed structure
35 Bed end board of the sleeping platform structure
36 Rising axis of the structural parts
37 Frame tube of the tubular motor
38*a* Electric motor of the tubular motor
38*b* Brake of the tubular motor
38*c* Gear of the tubular motor
38*d* Drive wheel of the tubular motor
39 Tubular motor
40 Transmission chain mechanism
41 Rotation cylinder of the roller lift door
42 Mounting plate of the roller lift door mechanism
43 Lifting wheels of the lateral tilt angle adjustment of the bed

The invention claimed is:

1. An adjustable pedestal structure of a bed configured for placement under a sleeping platform of the bed and is arranged to support the sleeping platform of the bed, wherein a height position of the sleeping platform of the bed and a longitudinal tilt position of the bed are adjustable, the adjustable pedestal structure comprising: a foot structure; an axle connected to the foot structure; and three structural parts connected to each other and supported by the foot structure, wherein the three structural parts comprise: (a) a lower structural part comprising a lower structural part rotation cylinder inside which is located the axle connected to the foot structure, lower structural part lever arms connected to the lower structural part rotation cylinder, and a lower structural part axle connected to the lower structural part lever arms at ends opposite from the lower structural part rotation cylinder; (b) a middle structural part comprising a middle structural part rotation cylinder inside which is located the lower structural part axle, middle structural part lever arms connected to the middle structural part rotation cylinder, and a middle structural part axle connected to the middle structural part lever arms at ends opposite from the middle structural part rotation cylinder; and (c) an upper structural part comprising an upper structural part rotation cylinder inside which is located the middle structural part axle of the middle structural part, and upper structural part lever arms connected to the upper structural part rotation cylinder and configured to attach to a sleeping platform frame structure of a bed, wherein the adjustable pedestal structure further comprises gas springs configured to assist an electrically operated adjustment mechanisms, and wherein the gas springs comprise first gas springs, second gas springs, and third gas springs, the first gas springs connect to the foot structure and to the lower structural part lever arms for moving the lower structural part of the adjustable pedestal structure, the second gas springs connect to the lower structural part lever arms and to the middle structural part lever arms to move the middle structural part of the adjustable pedestal structure, and the third gas springs connect to the middle structural part lever arms and to the upper structural part lever arms to move the upper structural part of the adjustable pedestal structure, wherein motor housings of linear actuators of the adjustable pedestal structure include a first motor housing connected to a mounting flange of the axle connected to the foot structure, a second motor housing connected to a mounting flange of the lower structural part axle, and a third motor housing to a mounting flange of the middle structural part axle, and wherein a first of the linear actuators is arranged to push and pull a first connecting module of pushing wheels and guide bearings connected to an actuator spindle of the first of the linear actuators in a direction parallel to the axle connected to the foot structure located inside the lower structural part rotation cylinder, a second of the linear actuators is arranged to push and pull a second connecting module of pushing wheels and guide bearings connected to an actuator spindle of the second of the linear actuators in a direction parallel to the lower structural part axle inside the middle structural part structural rotation cylinder, and a third of the linear actuators is arranged to push and pull a third connecting module of pushing wheels and guide bearings connected to an actuator spindle of the third of the linear actuators in a direction parallel to the middle structural part axle inside the upper structural part rotation cylinder, whereby a force exerted by the pushing wheels of the first, second or third connecting module causes a rotational adjustment movement of a respective one of the lower structural part rotation cylinder, the middle structural part rotation cylinder, or the upper structural part rotation cylinder clockwise or counterclockwise around a respective one of the axle connected to the foot structure, the lower structural part axle, or the middle structural part axle.

2. The adjustable pedestal structure of a bed according to claim 1, wherein the rotation adjustment movements of the lower structural part rotation cylinder and the lower structural part lever arms connected thereto, the middle structural part rotation cylinder and the middle structural part lever arms connected thereto, and the upper structural part rotating cylinder and the upper structural part lever arms connected thereto of the adjustable pedestal structure take place around the axles located inside the respective structural part rotation cylinders, the axle connected to the foot structure, the lower structural part axle connected to the ends of the lower structural part lever arms, and the middle structural part axle connected to the middle structural part lever arms so that the lower, middle and upper structural part rotation cylinders of the all of the structural parts and the lever arms connected thereto are adjusted simultaneously, or one of the lower, middle and upper structural part rotation cylinders and the lever arms connected thereto are adjusted alone, or two of the lower, middle and upper structural part rotation cylinders of two of the structural parts and the lever arms connected thereto are adjusted simultaneously.

3. The adjustable pedestal structure of a bed according to claim 1, wherein a rotation mechanism between the lower structural part rotation cylinder and the axle connected to the foot structure, the middle structural part rotation cylinder and the lower structural part axle located inside the middle structural part rotation cylinder, and the upper structural part rotation cylinder and the axle of the middle structural part located inside the upper structural part rotation cylinder, and a connection mechanism comprises first grooved ball bearings attached to ends of mounting flanges of the axle connected to the foot structure, second grooved ball bearings attached to ends of mounting flanges of the lower structural part axle, and third grooved ball bearings attached to ends of mounting flanges of the middle structural part axle, and a first inner guide ring connected to an end of a frame tube of the lower structural part rotation cylinder and attached to a frame structure of one of the lower structural part lever arms, a second inner guide ring connected to an end of a frame tube of the middle structural part rotation cylinder and attached to a frame structure of a one of the middle structural part lever arms, and a third inner guide ring connected to an end of a frame tube of the upper structural part rotation cylinder and attached to a frame structure of one of the upper structural part lever arms.

4. The adjustable pedestal structure of a bed according to claim 1, wherein a wide first spiral flange or a first the narrow spiral flange is connected to an inner surface of the a frame tube of the lower structural part rotation cylinder, a second wide spiral flange or a second narrow spiral flange is connected to an inner surface of a frame tube of the middle structural part rotation cylinder, and a third wide spiral flange or a third narrow spiral flange is connected to an inner surface of a frame tube of the upper structural part rotation cylinder, and lengths and densities of threads of the first, second and third wide or narrow spiral flanges thereof vary individually whereby each of the structural part rotation cylinders has an individual speed of adjustment movement.

5. The adjustable pedestal structure of a bed according to claim 4, wherein a lower surface of the axle connected to the foot structure, a lower surface of the lower structural part axle connected to the ends of the lower structural part lever arms, and a lower surface of the middle structural part axle connected to the ends of the middle structural part lever arms each have a guide groove for the guide bearings of the respective first, second, or third connecting module which prevents a respective one of the first, second or third connecting module and the pushing wheels that move the wide spiral flange and the pushing wheels that move the narrow spiral flanges attached thereto from rotating and following the adjustment movement of the respective one of the lower, middle or upper rotation cylinder when the pushing wheels push or pull the wide spiral flange or the narrow spiral flanges attached to the inner surface of the frame tube of the rotation cylinder forwards and backwards in the direction parallel to the axle.

6. The adjustable pedestal structure of a bed according to claim 5, wherein spring-loaded ball head screws rest against the frame tubes of each of the lower, middle and upper structural part rotation cylinders, thereby preventing the guide bearings of the actuator spindle of the first, second or third actuator from falling out of the guide groove of a respective one of the axle connected to the foot structure, the lower structural part axle, or the middle structural part axle.

7. The adjustable pedestal structure of a bed according to claim 1, wherein a width of an inner surface of the foot structure of the pedestal which is open at a foot end of the bed is larger than a width of the sleeping platform frame structure of the bed which enables the sleeping platform structure of the bed to be adjusted to a vertical position.

* * * * *